US008134693B2

(12) United States Patent
Ciolli

(10) Patent No.: US 8,134,693 B2
(45) Date of Patent: Mar. 13, 2012

(54) TRAFFIC VIOLATION DETECTION, RECORDING AND EVIDENCE PROCESSING SYSTEM

(76) Inventor: Robert Ciolli, Mount Martha (AU)

( * ) Notice: Subject to any disclaimer, the term of this patent is extended or adjusted under 35 U.S.C. 154(b) by 0 days.

(21) Appl. No.: 12/689,294

(22) Filed: Jan. 19, 2010

(65) Prior Publication Data

US 2010/0128127 A1 May 27, 2010

Related U.S. Application Data

(60) Division of application No. 10/555,634, filed on Mar. 17, 2006, now abandoned, which is a continuation-in-part of application No. 10/430,032, filed on May 5, 2003, now Pat. No. 6,970,102.

(51) Int. Cl.
*G01B 11/26* (2006.01)

(52) U.S. Cl. ....... 356/28; 356/3.01; 356/4.01; 356/5.01; 356/28.5

(58) Field of Classification Search ......... 356/3.01–28.5
See application file for complete search history.

(56) References Cited

U.S. PATENT DOCUMENTS

| | | | | |
|---|---|---|---|---|
| 3,689,878 A * | 9/1972 | Thieroff | 340/907 |
| 5,041,828 A | 8/1991 | Loeven | |
| 6,138,912 A * | 10/2000 | Mitsuno | 235/384 |
| 6,914,541 B1 * | 7/2005 | Zierden | 340/937 |
| 6,970,103 B2 * | 11/2005 | Bortolotto | 340/937 |

FOREIGN PATENT DOCUMENTS

| | | |
|---|---|---|
| AU | 199856300 | 8/1998 |
| EP | 0 741 377 | 11/1996 |
| WO | WO 97/33262 | 9/1997 |
| WO | WO 9918554 A1 * | 4/1999 |
| WO | WO 02/082400 | 10/2002 |

OTHER PUBLICATIONS

International Search Report.

* cited by examiner

*Primary Examiner* — Thomas Tarcza
*Assistant Examiner* — Luke Ratcliffe

(57) ABSTRACT

A traffic violation or event detection, recording and processing system and method is disclosed which includes at least one camera (20 and 30) for monitoring a region under surveillance (31 and 33); means for supplying independently sourced and verifiable time, date and location of a violation; a storing means (54) for storing continuous images taken by the camera; a non-intrusive violation detection means for detecting vehicle presence and movement and for providing an indication of a violation; and processing means for identifying images stored in the storage means and which relate to a violation detected by the violation detection means so that images associated with a violation are identifiable and can be processed to provide evidence of the violation and also identify the vehicle associated with the violation.

22 Claims, 14 Drawing Sheets

TRAFFIC VIOLATION DETECTION, RECORDING AND EVIDENCE PROCESSING SYSTEM

RELATED APPLICATIONS

This application is a divisional of U.S. application Ser. No. 10/555,634, filed on Mar. 17, 2006, now abandoned and which is a continuation-in-part of U.S. application Ser. No. 10/430,032 filed 5 May 2003, now U.S. Pat. No. 6,970,102.

FIELD OF THE INVENTION

This invention relates to a violation detection and recording system for traffic violations such as red light traffic violations or speed violations and a violation evidence management and processing system.

BACKGROUND ART

Traffic camera law enforcement has traditionally used 35 mm film-based cameras for the detection of speed and red-light violations.

In the case of red light violations, the camera is used in conjunction with vehicle detection systems that are usually in-ground (in-road) sensors eg inductive loops, which detect the presence of a vehicle at a particular point on the roadway. The camera system is also connected to the traffic signal controller, generally the red feed for the purpose of co-coordinating to the red signal phase. In principle an image of an offending vehicle is taken when a vehicle is detected about to enter the intersection, and/or in the intersection during the red signal phase. A common practice is to take two (2) images of a vehicle as it progresses through the intersection in order to provide sufficient evidence for a prosecution.

With speed violations, similar film-based cameras are used with a speed-measuring device—either in-ground loops for fixed-speed traps, or radar commonly used by mobile speed enforcement units. For speed enforcement, a picture of the vehicle is captured when the speed measuring system detects a vehicle traveling at a speed in excess of a preset threshold speed.

The film-camera systems have required white light illumination generally in the form of flash units, to provide sufficient light to capture violation images in poor ambient light or at night.

With the advent of digital imaging traffic cameras the film-based cameras are being replaced by digital cameras however the violation detection and recording and illumination systems have remained fundamentally as for film-based operations.

Similarly while the advent of digital cameras is removing the need to digitise film images to allow automated processing and allows the option of centralised processing, processing software still has to be installed and maintained locally in each processing or user location. Additionally, users other than authorized processing officers must typically request issue of violation information according to standard formats or reports and are barred from interactivity with system data.

The fundamental disadvantages of these commonly applied systems are:

(a) The detection system is invariably unable to provide a trigger point that is sufficiently consistent to ensure that the positioning of vehicles at the time of imaging is identical. To compensate for this a wider angle lens is used with the consequence of reducing the available resolution for effective and efficient license plate recognition during subsequent evidence processing;

(b) Conventional system's typically capture a single image of the vehicle licence plate. If this image is obscured or poorly focussed, it may be impossible to identify the vehicle. Likewise, with only one image of the driver, it may be difficult or impossible to provide an identifiable driver image where this is required;

(c) High construction and maintenance costs (ie because of the costs of installing and maintaining in-ground sensors, underground cabling and connections to traffic signal controllers, flash units and in some instances where digital cameras are used, communications lines);

(d) The use of flash illumination may be detrimental at night to oncoming traffic and has the potential to cause temporary driver blindness and consequent safety risks as well as preventing authorities from deploying systems covertly;

(e) The requirement to install flash illumination units (often on a separate pole) also incurs additional supply, installation, maintenance and running costs and creates additional visual pollution;

(f) Where digital cameras are used, systems either require the availability of high-speed communications lines to meet the demands of communicating high-resolution images, or else images and data must be collected manually;

(g) Purpose built, high-resolution, digital traffic cameras are relatively expensive, adding to costs of traffic program installations and operation.

(h) Traffic violation evidence collected by conventional systems includes time and data information provided by the camera computer clock which can be subject to error and therefore can prejudice the validity of evidence.

(i) The requirement that violation processing software be installed and maintained in all computers in all processing offices and on all client computer systems in the various client locations incurs high program implementation and support costs.

(j) With the exception of authorised processing personnel, users of violation evidence such as courts or police departments have been denied interactive access to information held by the central processing system and have only been able to request and view standard reports prepared for them by the relevant processing office.

Furthermore, traffic violation systems often use cameras which are housed in dome enclosures. Using low-cost digital video cameras as capture devices places inherent limitations on the resolution of the video-footage. To counter this, a high powered lens is required. However, the size and weight of high powered lenses makes them impractical for dome enclosures, because much of the space in the enclosure needs to be taken up by a motor and moving mechanism for moving the camera. Thus, a reduced amount of room is provided for the lens. Furthermore, the size of the camera and lens is limited by the power of the motor controlling its movement.

SUMMARY OF THE INVENTION

The object of the invention is to provide a system which addresses at least some of the above fundamental disadvantages of conventional systems.

The invention, in a first aspect, may be said to reside in a traffic violation or event detection, recording and processing system, including:

at least one camera for monitoring a region under surveillance;

means for supplying independently sourced and verifiable time, date and location data to provide an indication of the time, date and location of a violation;

a storing means for storing continuous images taken by the at least one camera;

a non-intrusive violation detection means for detecting vehicle presence and movement through the region and for providing an indication of a violation; and processing means for identifying images stored in the storage means and which relate to a violation detected by the violation detection means so that images associated with a violation are identifiable and can be processed to provide evidence of the violation and also identify the vehicle associated with the violation.

This aspect of the invention may also be said to reside in a method of detecting a traffic violation, including the steps of:

monitoring a region of a roadway with at least one camera;

monitoring vehicle presence and movement through the region using a non-intrusive vehicle detection means storing images taken by the at least one camera;

detecting a traffic violation in the region under surveillance;

determining images stored by the storage means and which relate to the traffic violation so that images can be used as evidence of the violation and also to identify the vehicle associated with the violation; and stamping the images with time, date and location data which is independently sourced to provide the time, date and location of the violation.

Thus, according to this aspect of the invention, there is no requirement to trigger camera imaging of vehicles in the region under surveillance because the cameras continuously take images of that region. Images captured by the at least one camera can be used to show the violation and to identify the vehicle associated with the violation. Since the violation detection means detects when a violation occurs, and the continuous captured images which relate to that violation are determined, lo-lux, relatively inexpensive cameras can be used that require no flash illumination.

Thus, the system and method of this aspect of the invention do away with the need to provide an intrusive vehicle presence detection system such as inductive loops or other physical sensors and more importantly, the detection system need not provide a trigger point because the region under surveillance is continuously monitored by the cameras and images are continuously stored.

In one embodiment of the invention the traffic event being detected recorded and processed is a red light violation.

In one embodiment of the invention the system includes at least one wide angle camera and at least one narrow angle camera. The wide angle camera can provide an image of the area under surveillance, and the narrow angle camera can provide an image which enables a vehicle involved in the violation to be identified.

In this embodiment the violation detection means comprises image processing means for processing images captured by the said wide angle camera or at least one narrow angle camera to identify changes in the colour of the traffic signals to thereby make a determination of the commencement and end of a red light traffic phase and therefore define a violation period. If the violation detection means determines that a vehicle is in the region under surveillance during that period, a set of multiple images stored in the storage means for that period is identified and then processed to provide evidence of the violation event. Another set of multiple images captured by a narrow angle camera during that period is identified and then processed also to identify the vehicle associated with the violation. Finally, if required under law, a further set of multiple images captured by an additional narrow angle camera during that period is identified and then processed to identify the driver of the vehicle associated with the violation.

In this embodiment of the invention most preferably a vehicle in the region under surveillance during the red light phase period is determined by the processing means processing images captured by one of the cameras so that by comparing images a change in image can identify a vehicle passing through the region during the red light phase. Thus, in the preferred embodiment of the invention the wide angle camera which captures images of the region under surveillance can also capture images of the traffic signals to enable the red light phase of the signals to be identified. However, in other embodiments separate cameras could be used for capturing images of the region under surveillance and the traffic lights so that one camera is dedicated only to capturing images of the traffic lights and not the region under surveillance.

Preferably the cameras are off the shelf digital or video cameras with an ability to take images in very low (or close to zero lux) lighting conditions and have an auto iris to adjust for such differing lighting conditions. Such cameras are readily available and made by numerous well known manufactures including Sony, Kodak, Canon, Philips and others.

Preferably the cameras have a pixel resolution of 768 by 576 and a sustainable imaging rate of at least twenty five frames per second.

Preferably the storage means includes temporary memory buffers for temporarily continuously storing images taken by the wide angle camera and at least one narrow angle camera, and a secondary storage means for storing images associated with a violation so that the images stored in the secondary storage means can be communicated for subsequent processing to provide the evidence of the violation and also the vehicle associated with the violation. All images recorded by the cameras are stamped with GPS-sourced location, date and time information and other relevant violation data.

In this embodiment the images stored in the temporary storage means can be deleted, or overwritten, after a predetermined period.

In the preferred aspects of this embodiment the wide angle camera continuously captures images of the traffic signal so that the red traffic signal can be identified to make the determination of the commencement and end of the red light traffic phase.

In one embodiment the non-intrusive vehicle detection device that monitors vehicle presence in and movement through the intersection utilises a camera, mounted perpendicular to the roadway, to continuously capture images of all traffic lanes and applies computer imaging software to analyse these images to track and identify vehicle movement in the region under surveillance.

In another embodiment of the invention, the non-intrusive violation detection means comprises:

apparatus for determining when a red light phase of a traffic signal is present; and a device for determining when a vehicle has violated the red light phase of the traffic signal whilst the red light phase of the traffic signal is active.

In one embodiment the apparatus may comprise the said processing means for processing an image of the traffic signal to identify when the red light phase of the traffic signal is present.

However, in other embodiment the apparatus comprises an inductive sensor for determining when current is supplied to the traffic signal to thereby provide an indication that the red light phase is active.

In one embodiment the device for determining when the vehicle has violated the red light signal comprises a camera mounted perpendicular to the direction of traffic flow for determining when a vehicle crosses a predetermined line whilst the red light phase is active, thereby indicating that the vehicle has committed a violation of the red light phase of the traffic signal.

In another embodiment the device may comprise at least one ranging laser for detecting a vehicle.

In one embodiment a plurality of narrow angled cameras are utilised for monitoring respective parts of the region so that all parts of the region are monitored by the plurality of narrow angled cameras.

In one embodiment each narrow angled camera monitors a lane of the roadway.

In one embodiment the narrow angled cameras are used to provide a series of images of the vehicle so that the number plate of the vehicle can be identified to thereby identify the vehicle associated with the violation.

An enhancement of this red light violation detection and recording system may provide an intersection accident monitoring means to monitor and record images of traffic accidents within the region under surveillance during any traffic signal phase.

In this enhancement, an accident monitoring means is incorporated to monitor and record the ambient sound within the region under surveillance.

Preferably the accident monitoring means will comprise a sound monitoring device or microphone that analyses sound recordings to detect noise signatures of a traffic accident. When such a noise signature is detected, a set of multiple images taken by the wide angle camera and stored in the storage means for that period is identified to provide a visual record of the traffic accident.

In a second embodiment of the invention the traffic event being detected recorded and processed is a speed violation.

In this embodiment the violation detection means comprises vehicle speed determining means for determining the speed of a vehicle in the region under surveillance.

Most preferably the speed determination means comprises a non-intrusive Doppler radar system or a laser device.

In this embodiment when a vehicle is detected exceeding a preset speed threshold by the violation detection means a set of multiple images stored in the storage means and associated with the violation is identified and processed to provide evidence of the violation and also to identify the vehicle associated with the violation.

Preferably the temporary storage means comprises temporary memory buffers.

Preferably the cameras are off the shelf digital or video cameras with an ability to take images in very low (or close to zero lux) lighting conditions and have an auto iris to adjust for such differing lighting conditions. Such cameras are readily available and made by numerous well known manufactures including Sony, Kodak, Canon, Philips and others.

Preferably the cameras have a pixel resolution of 768 by 576 and a sustainable imaging rate of at least twenty five frames per second.

The invention may also be said reside in a traffic violation detection, recording and evidence processing system, including:

- at least one camera for monitoring a region under surveillance and for viewing a traffic signal which includes traffic lights which change, to control flow of traffic through the region;
- temporary storage means for continuously storing images taken by the at least one camera;
- processing means for processing images taken by the at least one camera to determine changes in traffic lights of the traffic signal to determine the commencement and end of a traffic phase of the traffic signal to define a violation period; and
- processing means for determining that a violation has occurred from the images captured by the at least one camera and for identifying those images in the temporary storage means which are associated with the violation so that those images associated with the violation can be processed to provide evidence of the violation and to identify the vehicle associated with the violation.

Preferably the processing means includes secondary storage means for storing the images originally stored in the temporary storage means and which are associated with the violation.

Preferably the system includes a communication link for communicating images stored in the secondary storage device to a central facility for processing to provide evidence of the violation and identify the vehicle associated with the violation and the driver if required.

In one embodiment at least one camera comprises a wide angle camera which captures an image of the region under surveillance and also of the traffic signal, and a plurality of narrow angle cameras for monitoring different parts of the region under surveillance.

Preferably the secondary storage device comprises a hard disc of the processing means.

Preferably the communication link is a wireless and/or Internet enabled communication link for transmission of data including the images relating to a violation from the processing means to a central facility.

This aspect of the invention may also be said to reside in a method of detecting a traffic violation including the steps of:

- detecting a region of a roadway and a traffic signal by at least one camera;
- continuously capturing images of the region and signal and temporarily storing those images;
- detecting from the images changes in the traffic signal so that the commencement and end of a particular light traffic phase can be determined to define a violation period; and
- detecting a traffic violation in the violation period and identifying the stored images associated with the violation so that the stored images can be processed to provide evidence of the violation and identify the vehicle associated with the violation.

In a third embodiment of the invention the traffic event being detected recorded and processed is an traffic accident occurring in an intersection.

In this embodiment the event detection means comprises sound monitoring means for determining the sound level of a vehicle in the region under surveillance.

The sound monitoring means comprises a microphone and ambient sound measuring device.

In this embodiment when the sound monitoring means detects a vehicle exceeding a preset noise threshold a set of multiple images recorded by the wide angle camera and corresponding sound recordings associated with the violation are stored in the storage means and are identified and processed to provide a visual record of the accident.

Preferably the temporary storage means comprises temporary memory buffers.

Preferably the cameras are off the shelf digital or video cameras with an ability to take images in very low (or close to zero lux) lighting conditions and have an auto iris to adjust for such differing lighting conditions.

Such cameras are readily available and made by numerous well known manufactures including Sony, Kodak, Canon, Philips and others.

Preferably the cameras have a pixel resolution of 768 by 576 and a sustainable imaging rate of at least twenty five frames per second.

This aspect of the invention may also be said reside in a traffic event detection recording and processing system, including;

- at least one wide angle camera for monitoring a region under surveillance;
- a sound monitoring means to monitor and record ambient sound in the region under surveillance;
- temporary storage means for continuously storing images taken by the at least one camera and corresponding sound recordings; and
- processing means for determining that an intersection accident has occurred by analysing the sound recordings obtained by the sound monitoring means and identifying those sound recordings and images which are associated with the accident event to provide a visual record of the event.

Preferably the temporary storage means comprises temporary memory buffers.

Preferably the processing means includes secondary storage means for storing the images and corresponding sound recordings originally stored in the temporary storage means and which are associated with the event.

Preferably at least one wide angle camera continuously monitors the region under surveillance.

Preferably the sound monitoring means comprises at least one microphone or sound recording device that records the ambient sound of the region under surveillance.

Preferably the processing means includes secondary storage means for storing the images and corresponding sound recordings originally stored in the temporary storage means and which are associated with the event.

Preferably the secondary storage device comprises a hard disc of the processing means.

Preferably the communication link is a wireless and/or Internet enabled communication link for transmission of data including the images relating to the event from the processing means to a central facility.

The invention still further provides a method of storing and managing evidence of traffic violations and events which are detected and recorded by a plurality of violation detection and recording systems comprising the steps of:

- continuously communicating evidence of traffic violations and events to at least one server;
- providing real-time communications between all violation detection and recording systems and the server(s);
- providing a database containing information relating to violations detected by the violation detection and recording systems;
- dividing the database according to the different access requirements of different categories of authorised users with each user's level of access and functionality being automatically defined by their unique password and log-in process;
- allowing browser-based access to information held in the database or databases at a pre-defined level of authority for any authorised user using a computer with Internet connectivity;
- allowing interactive access to and operation of the violation processing system for individual users to perform evidence management tasks required by the authorities operating the system.

The invention also provides a method of detecting and recording an event comprising the steps of;

- continuously capturing and analysing ambient sound of a region under surveillance to detect a defined event;
- monitoring the region by at least one camera;
- continuously capturing images of the region and temporarily storing those images; and
- detecting a violation from the captured sound and identifying the stored images associated with the event so that the stored images can be processed to provide evidence of the event.

In a fourth embodiment of the invention a violation processing solution utilises Internet connectivity to provide a central database that allows interactive access accessed by authorised users in any location.

A further aspect of the invention is concerned with providing a traffic violation system and camera which is more suitable for dome enclosures.

The invention in a further aspect therefore provides a traffic violation detecting system, comprising:

- a fixed camera for monitoring a plurality of lanes of a road and providing images of vehicles travelling in the lanes;
- a violation detecting system for detecting a traffic violation in any one of said plurality of lanes; and
- a reflecting system for selectively directing illumination from said any one of said plurality of lanes to said camera so that when a violation occurs in any one of said lanes, the reflecting system directs illumination from that lane to the camera so the camera can capture images of the violation occurring in that lane.

Thus, according to this aspect of the invention, a single camera can be used to provide images from a number of lanes without the need to move the camera. A fixed camera can be used because the reflecting system will reflect illumination from the lane in which a violation occurs to the camera. Thus, a motor need not be provided to move the camera and therefore the size of the camera is not limited by the power of a motor needed to control its movement. Because the camera need not be moved, if a mechanism is used to move the reflecting system, the mechanism need be much smaller than that required to move the camera, less space is taken up in a dome enclosure. A low cost camera can therefore be used and also a high powered lens provided to overcome inherent limitations on the resolution of the images captured by the camera. Thus, the need for a larger motor or a bulkier dome is avoided.

Preferably the reflecting system comprises a mirror and an adjusting mechanism for moving the mirror so the mirror reflects illumination from the said any one of the lanes to the camera.

Preferably the violation detecting system provides information relating to the lane in which a traffic violation is occurring, and the system further comprises a processor for receiving that information and for outputting control signals to control the mirror to thereby adjust the position of the mirror so as to reflect illumination from the lane in which the violation is occurring so the camera captures images of the violation in that lane.

In another embodiment the reflecting system comprises a plurality of fixed mirrors, each for reflecting illumination from one of the plurality of lanes to a portion of an image capture component of the camera.

Preferably the violation detecting system comprises:

an inductive sensor for sensing when a red light phase of a traffic signal is present; and a vehicle detector for detecting when a vehicle is present in a specified portion of the road.

Preferably the inductive sensor is mounted in proximity to an electric wire for supplying electricity to activate the red light phase of the camera.

Thus, in the preferred embodiment the sensor detects electricity flow through electric wire which supplies current to the red light of a traffic signal. However, the sensor could be for detecting current flow to the green light or the amber light so that the red light phase is determined when there is no sensed current flow to either the green light or amber light of a traffic control signal.

Preferably the vehicle detector comprises at least one ranging laser per lane for detecting the presence of the vehicle.

Most preferably the vehicle detector comprises at least two ranging lasers per lane so that the lasers cannot only determine the presence of the vehicle, but also the speed at which the vehicle is travelling.

However, in another embodiment, the vehicle detector may comprise a camera mounted perpendicular to vehicle flow along the road.

Preferably the camera has a source of illumination for illuminating the said any one of the lanes so that the illumination is reflected back from the said any one of the lanes by the reflecting system.

Preferably the camera has a fixed lens mounted between the camera and the reflecting system.

Preferably the source of illumination comprises an infrared laser mounted on the camera and directed at the reflecting system for providing infrared illumination to illuminate the said one of the lanes.

Preferably the system includes a storage for storing images captured by the camera and for identifying images which relate to a violation detected by the violation detection means so that the images associated with the violation are identifying and can be processed to provide evidence of the violation and also identify the vehicle associated with the violation.

Preferably the system includes a storage for storing images captured by the wide angled camera and for identifying images stored in the storage and which relate to the violation detected by the violation detection means so that the images associated with the violation are identifiable and can be processed to provide a wide angle view of the violation.

The system may also further include at least one camera for capturing images of a driver of the vehicle, and a storage for storing the images, the processor also being for identifying images captured by the at least one camera and for identifying images captured by the at least one camera and which relate to the violation detected by the violation detection means so that images of the driver of the vehicle associated with a violation are identifiable and can be processed to provide evidence of the identity of the driver of the vehicle associated with the violation.

Preferably the system further comprises:

a temporary storage for continuously storing images taken by the fixed camera; and a processor for identifying those images in the temporary storage which are associated with the violation so that those images associated with the violation can be processed to provide evidence of the violation.

Preferably the system still further comprises a secondary storage for receiving the images associated with the violation from the temporary storage, and for storing the images which are associated with the violation.

Preferably the system still further comprises a communication link for communicating images stored in the secondary storage to a central facility for processing to provide evidence of the violation.

This aspect of the invention further provides a dome camera assembly for a traffic violation system comprising:

a housing having a dome;

a fixed camera mounted in the housing for monitoring a plurality of lanes of a road through the dome; and a reflecting system in the housing for selectively reflecting illumination from any one of the plurality of lanes to said fixed camera.

Preferably the housing has a cool chamber in which the camera is mounted and a warm chamber defined by at least part of the dome, the reflecting system being located in the warm chamber, and a heat transferring medium arranged for transferring heat generated by the camera from the cool chamber into the warm chamber.

Preferably the heat transferring medium is a Peltier heat transfer layer which separates the cool chamber from the warm chamber.

Preferably the camera has a lens which is arranged in the warm chamber and in optical communication with the camera through an opening in the Peltier layer.

Preferably the reflecting system comprises a mirror and an adjusting mechanism for moving the mirror so that the mirror reflects illumination from the said any one of the lanes to the camera, in response to detection of a traffic violation in any one of the lanes so the camera can capture images of the violation occurring in that lane.

In another embodiment, the reflecting system comprises a plurality of fixed mirrors, each for reflecting light from one of the plurality of lanes to a portion of an image capture component of the camera.

BRIEF DESCRIPTION OF THE DRAWINGS

Preferred embodiments of the invention will be described, by way of example, with reference to the accompanying drawings in which.

DETAILED DESCRIPTION

Figure 1:
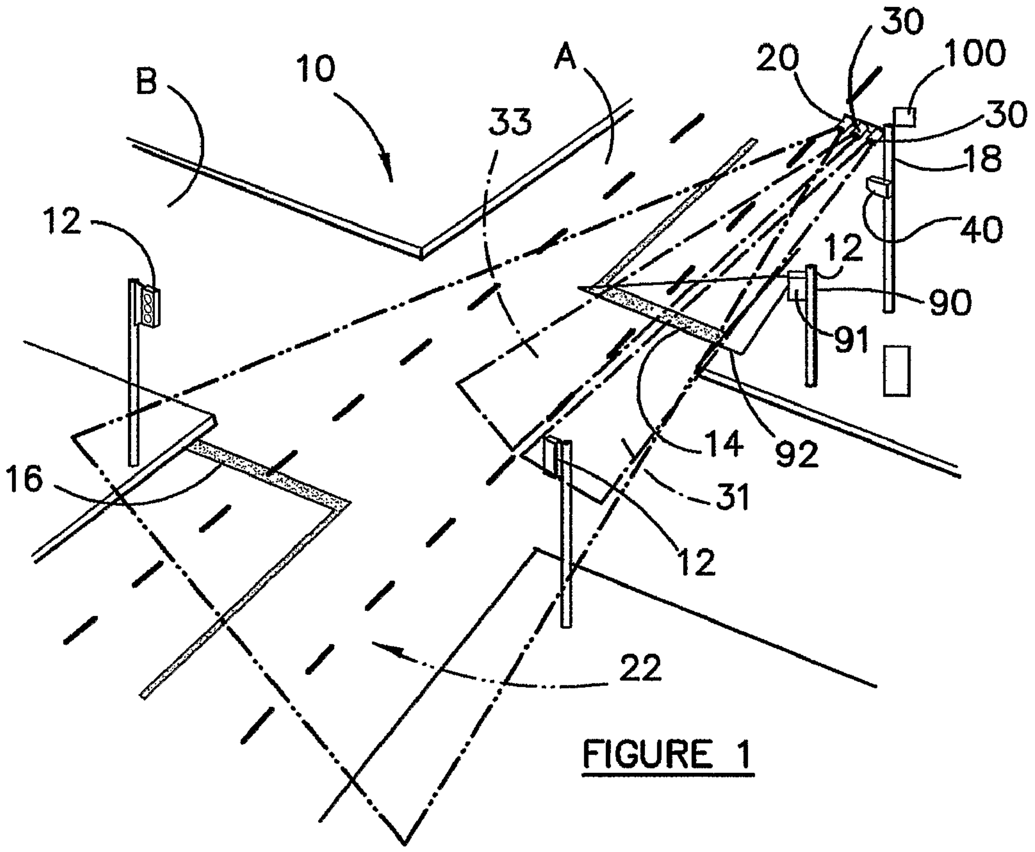
FIG. 1 is a view illustrating an embodiment of the traffic violation system according to the invention which is used for red light traffic violations.

With reference to FIG. 1 an intersection 10 which is controlled by traffic signals 12 (only two of the signals shown for ease of illustration) is comprised of intersecting roadways A and B. The roadway is marked with stop lines 14 and 16 (only those associated with the roadway A being shown) where vehicles will stop when a red light signal is displayed by the traffic signals 12. In the embodiment shown, the invention relates to a left side of the road driving environment such as that which exists in Australia. Obviously, the stop lines 14 and 16 are on the other side of the roadway in a right of the road driving environment such as that which exists in the United States of America. It should be understood that FIG. 1 is only showing a system for monitoring traffic flow in one direction along the roadway A. Additional systems can be used to monitor the traffic flow in the opposite direction on the roadway A and also in the two direction of roadway B if desired. The system according to this embodiment of the invention is mounted on a pole 18 and a pole 90 which may be existing poles or other road infrastructure, or specially installed poles. The pole 18 mounts a wide angle camera 20 which can monitor the entire intersection of the roadways A and B as shown by the area 22 in FIG. 1, and including at least one of the traffic signals 12 so that the image captured by the wide angle camera 20 includes the red light, amber light and green light associated with the traffic signals 12.

However, if desired, or necessary, not all of the lights of the traffic signal need to be detected. The purpose of detecting the light to the traffic signal 12 is to determine a violation period such as when a red light signal is displayed as will be described in more detail hereinafter. Thus, if desired or necessary, only the red light of one of the traffic signals 12 need be in the field of view of the wide angled camera 20. Furthermore, the violation period can be from commencement of an amber light to the end of the red light phase of the traffic signals, or some other desired period defined by changes in the lights of the traffic signals. Furtherstill, the traffic signals 12 need not be monitored by the wide angle camera which also captures images of the region under surveillance. Depending on the size of the intersection or on other circumstances, a separate dedicated camera (not shown) which only captures images of the traffic signals 12 may be provided in order to allow the violation period to be determined.

The pole 18 also mounts narrow angle or lane cameras 30 each of which monitors or images one of the lanes of the roadway A. In the embodiment shown the roadway A has two lanes in each direction and therefore two lane cameras 30 are provided. If more than two lanes are provided additional lane cameras 30 are utilised. The pole 90 mounts a further camera 91 which is directed perpendicular to the flow of traffic along the roadway A.

The cameras 20 and 30 are connected to a site computer 40 which is housed in a roadside cabinet or the like.

The cameras 30 therefore monitor part of the intersection which is monitored by the wide angle camera 20 and the parts monitored by the two cameras 30 are identified by the reference numerals 31 and 33. The cameras 20 and 30 are preferably off the shelf digital or video cameras which take images in low lighting conditions and have an auto iris to adjust for different lighting conditions. Typically the cameras have a pixel resolution of 768 by 576 and sustainable imaging rate of twenty five frames per second or better.

Traffic movement through the intersection (of roadways A and B) is monitored by the narrow angle camera 91 mounted on pole 90, perpendicular to the roadway A. This camera monitors a section of the roadway identified by numeral 92 in FIG. 1. The camera 91 is also connected to the site computer 40.

Figure 3:
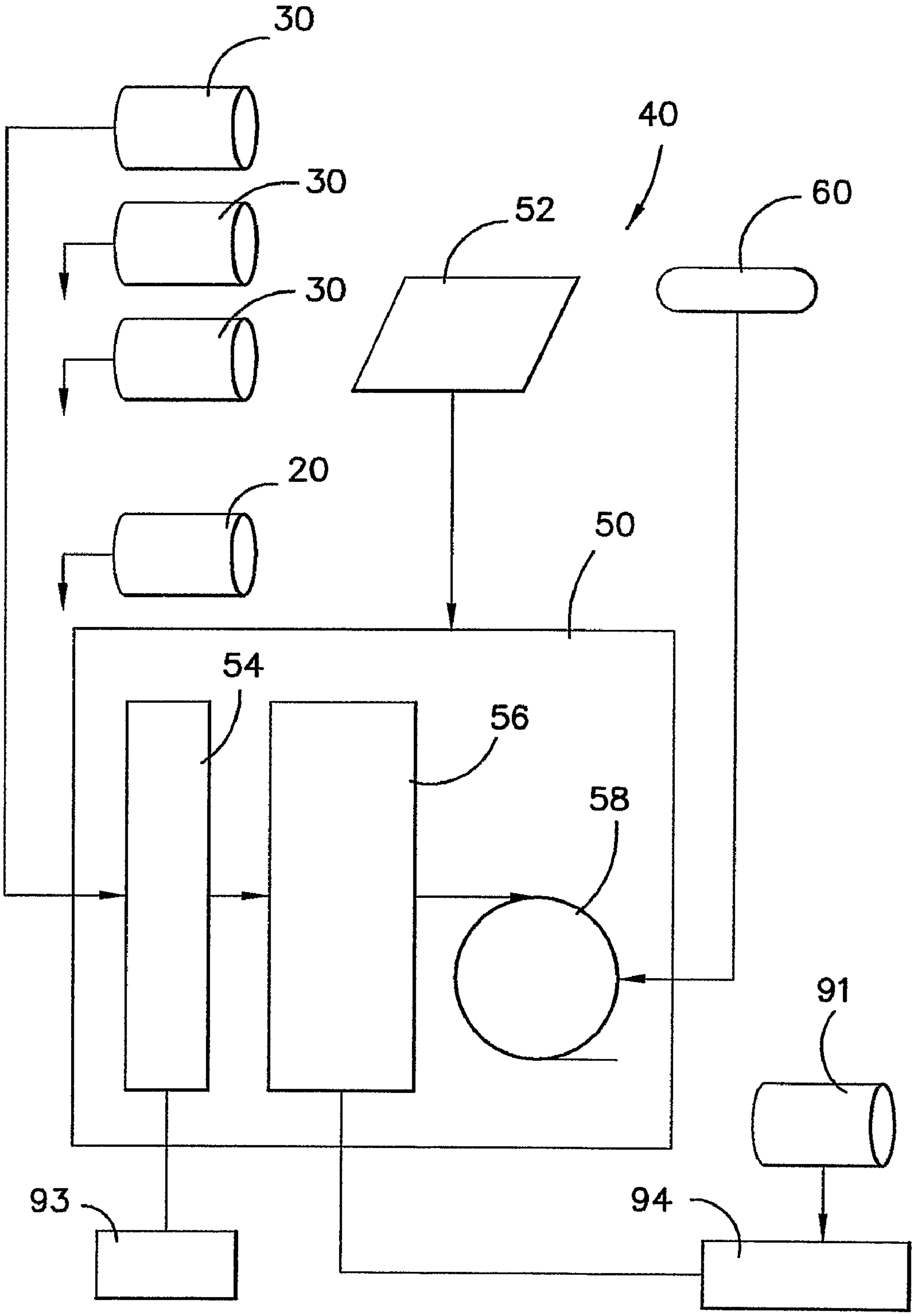
FIG. 3 is a schematic diagram of the system used in FIGS. 1 and 2.

As shown in FIG. 3 the cameras 30 (three shown in FIG. 3) and the camera 20 are connected to the site computer 40. The computer 40 includes a processing section 50 which is powered by a mains power supply 52.

The processor 50 includes memory buffer 54 which stores images captured by each of the cameras 20 and 30 and a processing section 56 which determines when a traffic violation has occurred and identifies the images stored in the memory buffer 54 and transfers those images to hard disc 58 so that only the images associated with the violation are stored on the hard disc 58. The hard disc 58 is connected to a wireless communication link 60 (or other communication link such as an Internet link) so that the data relating to the images stored on the hard disc can be transmitted to a central facility for further processing to provide a number of images which relate to the violation and also to identify the numberplate of the vehicle associated with the violation so that an appropriate penalty notice can be issued.

A global positioning system (GPS) 93 is connected to the buffer and stamps each image with an independently sourced date, time and location coordinates in order to identify the time and location of the event. The GPS system obviously obtains this data from satellites, as is conventional, in order to provide a location reference and this, together with the time reference produced by the GPS system 93, enables independently verified time and location data to be included to precisely identify the location of the event which is recorded by the system of the preferred embodiment of the invention.

In the preferred embodiment of the invention the processor 50 is equipped with sufficient buffer memory 54 for temporary storage of a sufficient number of images taken by both the wide angle camera 20 and the lane cameras 30 so as to provide sufficient evidence to cover one or a number of simultaneous violations and to provide the image sequence(s) to prove the violation(s). The wide angle camera 20 will capture images showing the violation, that is a vehicle moving through the intersection when the red light signal is displayed and the lane cameras 30 will take images of the vehicle in the lane concerned so that those images can be processed to determine the number plate of the vehicle concerned so the vehicle can be identified and the appropriate penalty notice issued.

In this embodiment the processing section 56 analyses the images taken by the camera 20 so that a change in the colour of the red light of the traffic signal 12 can be determined and therefore the commencement and end of the red light traffic phase of the signal 12 is determined. The system of the preferred embodiment also includes a traffic movement detection section 94 which is also connected to processing system 56. The detection section 94 analyses the images taken by the camera 91 to identify movement of traffic through the intersection during the red light phase of the traffic signal. If traffic movement through one of the lanes of the roadway is determined during the period of the red light phase, the section 94 triggers a traffic violation to be captured by processing section 56. The images which are associated with that violation are then transferred from the memory buffers 54 to the hard disc 58 so that a sequence of images captured by the wide angle camera 20 showing the vehicle moving through the intersection and also at least one image captured by one of the lane cameras 30 which show the vehicle in close up are also captured. Those images are transmitted via the wireless communication link 60 to a central facility where the images can be developed or printed to provide evidence of the violation and also the images are inspected so that the number-plate of the vehicle concerned can be determined so that the appropriate penalty notice can be issued.

In other embodiments, rather than detect the vehicle by virtue of analysis of images to determine the movement of a vehicle in the images, the image analysis equipment may be provided for detection or recognising a licence plate of a vehicle, so that if a recognised licence plate of a vehicle is seen in the image in the appropriate time zone indicative of the red light phase, a determination is made that a particular vehicle is present.

Since the invention enables relatively inexpensive cameras to be used and which can operate in effectively very low lux conditions, no supplementary flash illumination is required even at night. If lighting conditions are insufficient for operation of the cameras for any reason light intensifiers or infrared illuminators could be used in the system to enable images to be captured and processed to identify a violation.

As is apparent from the above description, in the preferred embodiment of the invention, a further camera 91 is used to determine movement of traffic through the intersection during the red light phase of the traffic lights. However, one of the other cameras 20 or 30 could be used to perform this function. The camera 91 is preferred because it is arranged perpendicular to the flow of traffic, and therefore, is able to more easily monitor movement of traffic because a movement will cross the path of the camera rather than move in the general direction of the field of view of the camera. Thus, processing of images to determine movement of a vehicle through the intersection is easier to perform with the camera 91 rather than by use of the cameras 20 or 30.

In order for the camera 91 to determine that a vehicle has crossed the stop line 14, a reference image is created based on histogram pixel values over a number of frames. The reference image is built up whilst traffic is moving, thereby minimising the chance of vehicles becoming part of the reference frame. The reference frame is continuously updated over time with new images captured by the camera 91, adding to the body of data which is used to establish the reference image and earlier images being discarded. The reference image is provided with a plurality of predefined trigger points and a violation is determined by comparing a captured image with the reference frame such as by simply subtracting the current image from the reference frame. If the comparison of the current frame with the reference frame determines something in the current frame at the predetermined trigger points, then an event is generated to show a violation has occurred.

By continuously updating the reference frame over time, changing conditions are automatically compensated for. That is, if ambient light conditions change or a shadow comes over the region, that will be built into the reference frame as the reference frame is continuously updated.

Furthermore, the way in which the reference frame is built up can change depending on the time of day. For example, at night the reference frame can be built up slightly differently to take into account vehicle headlights. The image which is associated with a violation is determined by the computer 40 by the time reference which is established by the GPS system 93. At the time of determining a violation event, the GPS system 93 enables a time reference to be created. The images which are captured by the cameras also have that time reference stamped on them, as has been previously explained. Thus, by knowing the time of the violation, the image which corresponds to that time can be transferred from the buffers 54 to the hard disc 58, together with a number of images on either side of that particular image, so that a set of images showing the violation can be retained. The images which are retained are those from the wide angle camera 20 and also the narrow angle cameras 30. If desired, the images which are captured by the camera 91 can also be retained.

Figure 4:
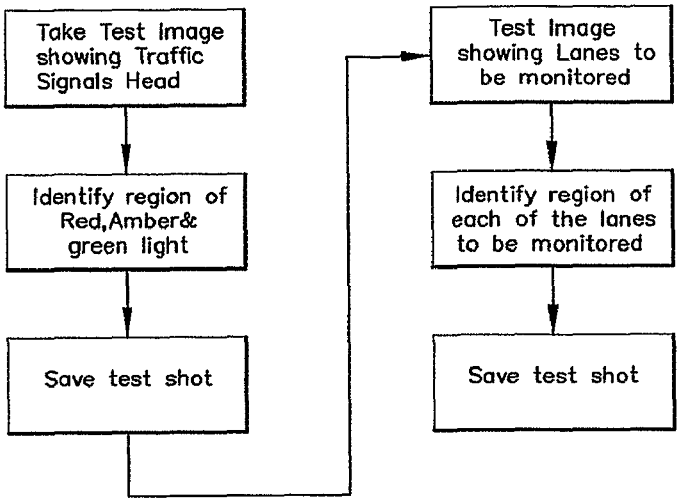
FIG. 4 is a flow chart relating to initial set up or calibration of the system according to the preferred embodiments.

FIG. 4 is a flow chart illustrating initial calibration or set up of the system of FIG. 1. The system of FIG. 1 is set up via a graphical user interface operating on a laptop that can be connected to the computer 40. The software will allow the operator to take test shots using the wide angle camera 20. On the test image captured by the operator the operator will define the position of the red signal heads (that is a red light) on the signals 12 by drawing a box, and defining the position of each of the red, green and amber signal lights. The operator will also draw a line to define the position of the stop line 14 on the image and will draw a series of lines to define each of the lanes of the roadway that are to be monitored.

The camera 91 is also calibrated in the same manner as described above and shown in FIG. 4. A test shot is taken by the camera 91, and on the test image which is captured, the operator will define the position of the stop line 14 and also each of the lanes which can be seen in that image. The operator will also identify a number of reference locations in the image which define trigger points to enable an indication of movement of a vehicle in captured images by the camera 91 to be determined so that the speed of the vehicle moving past the stop line 14 can be estimated.

Figure 5:
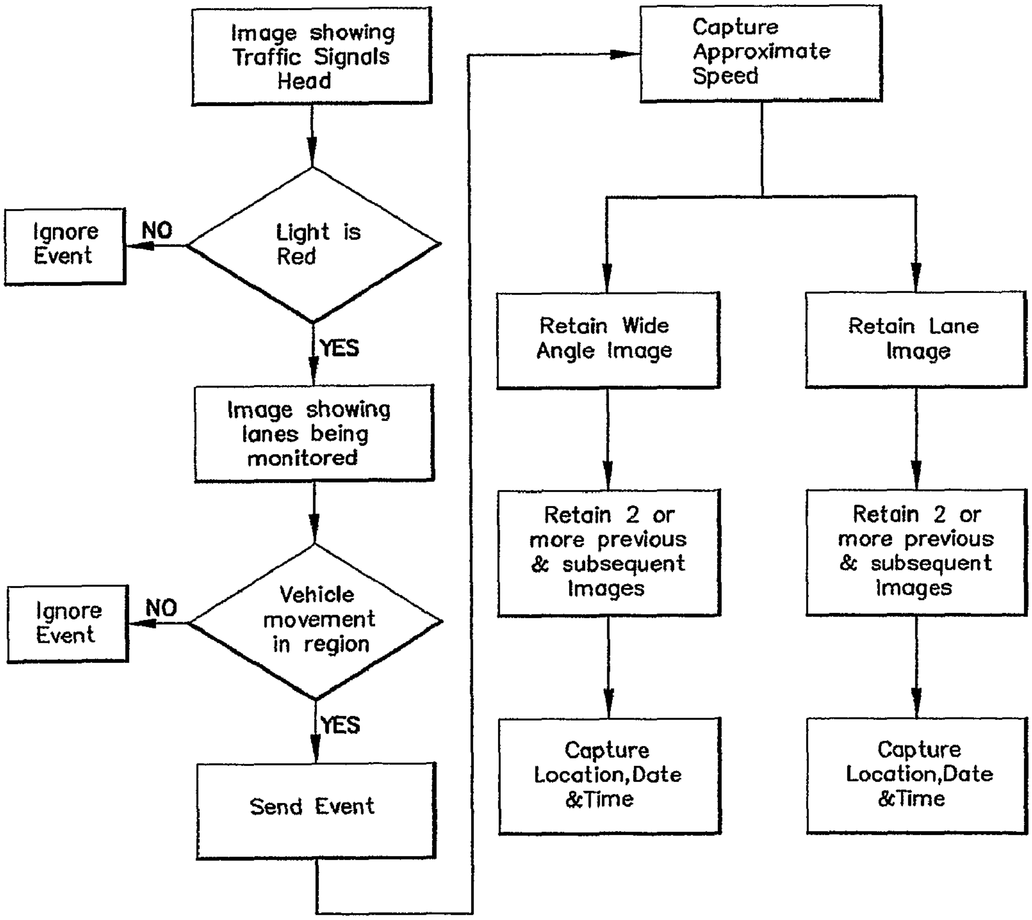
FIG. 5 is a flow chart illustrating operation of one embodiment of the system applicable to red light violations.

FIG. 5 is a flow chart explaining operation of the system of FIG. 1. Each frame taken by the wide angle camera is examined by the processing software to identify the status of the traffic signal. The colour pixels in the area defined by the setup system to identify the position of each of the red, green and amber signal lights are analysed and a determination will be made of the current phase. Each of the areas delineated by the setup software to represent the traffic lanes will be compared frame by frame. A determination will be made if movement is present during the red signal phase and if the movement continues past the stop line 14. The lane in which the movement is detected will also be recorded.

In the event that a movement beyond the stop line 14 is detected during the red light traffic phase, the images taken by the wide angle camera 20 (both before the point of detection and after the point of detection) will be retained and transferred from the buffer 54 to the hard disc 58. The images taken by the appropriate lane camera 30 are also retained and stored in the same manner. The images of the wide angle camera and the lane camera pertaining to the one event will be linked by a suitable identification code and additional information including the GPS sourced time, date, location, lane and approximate vehicle speed will be appended to the event images as a total image and data set. The data sets can be encrypted and also digital signature and compression algorithms can be used to compress the data and the data can then be transmitted by the communication link 60 to processing centre where the images can be decrypted and viewed for adjudication, verification, tamper validation and traffic penalty notice issuance.

As shown in the flow chart of FIG. 5, if the traffic signals are not in the red light phase, then any event which shows traffic movement through the intersection in the appropriate direction is ignored. If the red light phase is current, then any vehicle which moves through the intersection in the direction of the red light triggers an event which causes the captured images to be transferred to the hard disc 58. In the preferred embodiment of the invention, the system preferably retains at least two of the images prior to triggering of the event. That is, first detection of the vehicle crossing the line 14 during the red light phase of the traffic signals, the image associated with that actual event (ie., the image showing the vehicle crossing the line 14), and at least two images subsequent that event so that a number of images are provided, showing the camera approaching the line 14, reaching the line 14 and then passing into the intersection during the red light phase of the traffic signals. The GPS system, as previously noted, stamps the images with the location, date and time of the event.

In the preferred embodiment of the invention, the approximate speed of the vehicle, as the vehicle passes through the intersection 14, is also recorded. This is done by analysis of the images from the camera 91. The determination of the speed need not be as accurate as would be required if the violation being detected was actually a speed violation rather than a red traffic light violation. However, even with a red traffic light violation, some indication of the speed of the vehicle may be required in some jurisdictions. The speed of the vehicle in the embodiment of FIG. 1 is therefore determined by tracking the vehicle movement from frame to frame in the images captured by the camera 91, over a predefined distance on the road. Assuming that the frame rate is 50 half-fields per second, an estimation of the speed of the vehicle as it runs the red light can be made. The image captured by the camera 91 may have predetermined location points identified in it which can be compared with the position of the vehicle in the images so that an indication of the distance the vehicle has moved from one frame to the next frame can be determined.

Figure 2:
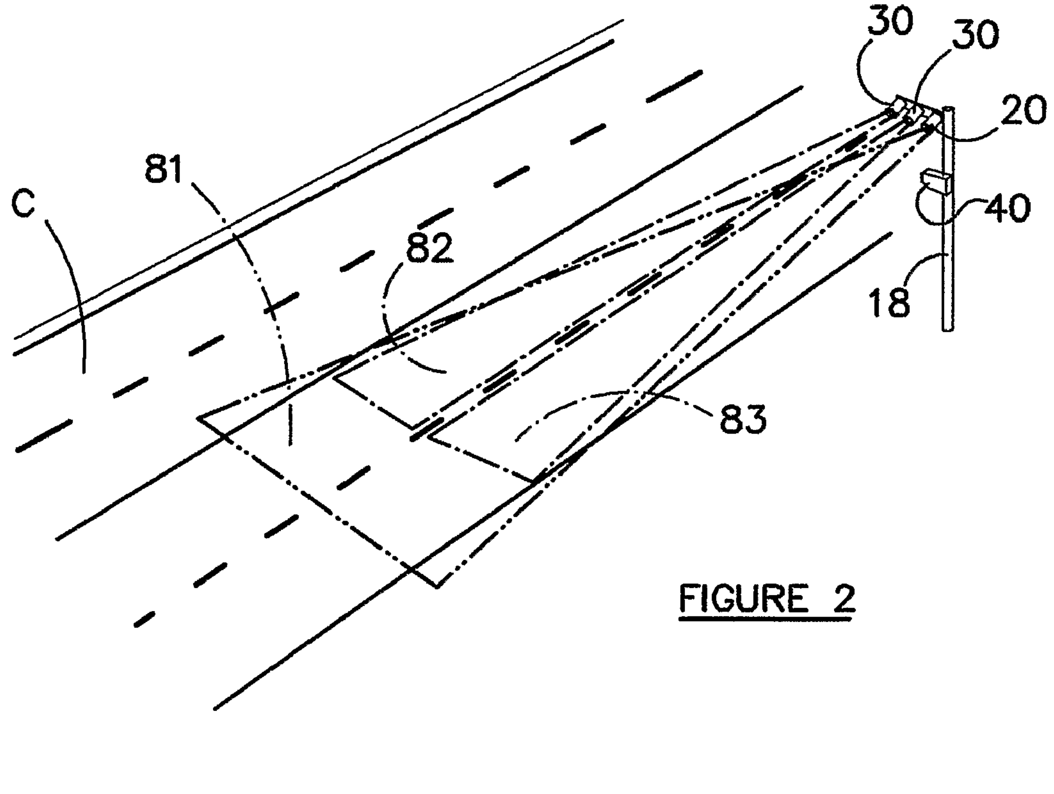
FIG. 2 is a diagram similar to FIG. 1 of a system used for speed violations.

FIG. 2 shows the system used for detecting speed violations. In this embodiment a region of a roadway C is monitored by wide angle camera 20 and each of the appropriate lane ways of the road C are monitored by lane cameras 30. As in the earlier embodiment the cameras 20 and 30 are connected to site computer 40. The regions monitored by the cameras 20 and 30 are shown by the reference numbers 81 insofar as the camera 20 is concerned and the reference numbers 82 and 83 insofar as the cameras 30 are concerned.

Initial set up in this embodiment is the same as that described with reference to FIG. 4 except that obviously the traffic signals 12 are not identified and the regions which are identified are the regions of the roadway monitored by the camera 20 and the specific lanes monitored by the cameras 30. Images are captured in the same way as described with reference to FIG. 1 and the determination for a speed event is made by an external speed measuring device such as Doppler radar or laser speed measuring device. The lane in which the vehicle is travelling is determined in the same manner as described with reference to FIGS. 1 and 3 to 5. When the speed measuring device detects a vehicle or vehicles exceeding the threshold speed which has been set by an operator, a number of images from both the wide angled camera and the lane cameras 30 (both before and after the speed event) are retained and stored together with information that include date, time, event location, direction of travel, and vehicle speed also lane information. This data is transmitted by the link 60 in the same manner as described above so, that the images can be processed to produce a penalty notice.

Since images are continuously captured by the cameras 20 and 30 in both of the embodiments described above and are stored in temporary buffer memory 54, it is not necessary to provide an intrusive vehicle detection system such as detectors in the roadway or to link the system to the traffic signals in order to provide a trigger to commence operation of the system to capture a violation. Rather, images are continuously captured and are processed so that, in the case of red light violation, the violation can be determined from processing, and those images associated with the violation are retained and transmitted for penalty note issuance, and in the case of a speed violation, when the speed detection equipment indicates a violation, images of the continuously captured images are then transferred to the hard disc 58 for transmission to the central facility.

As in the previous embodiment, the time, date and location of the event is stamped on the images which are captured by the GPS system 93.

Figure 6:
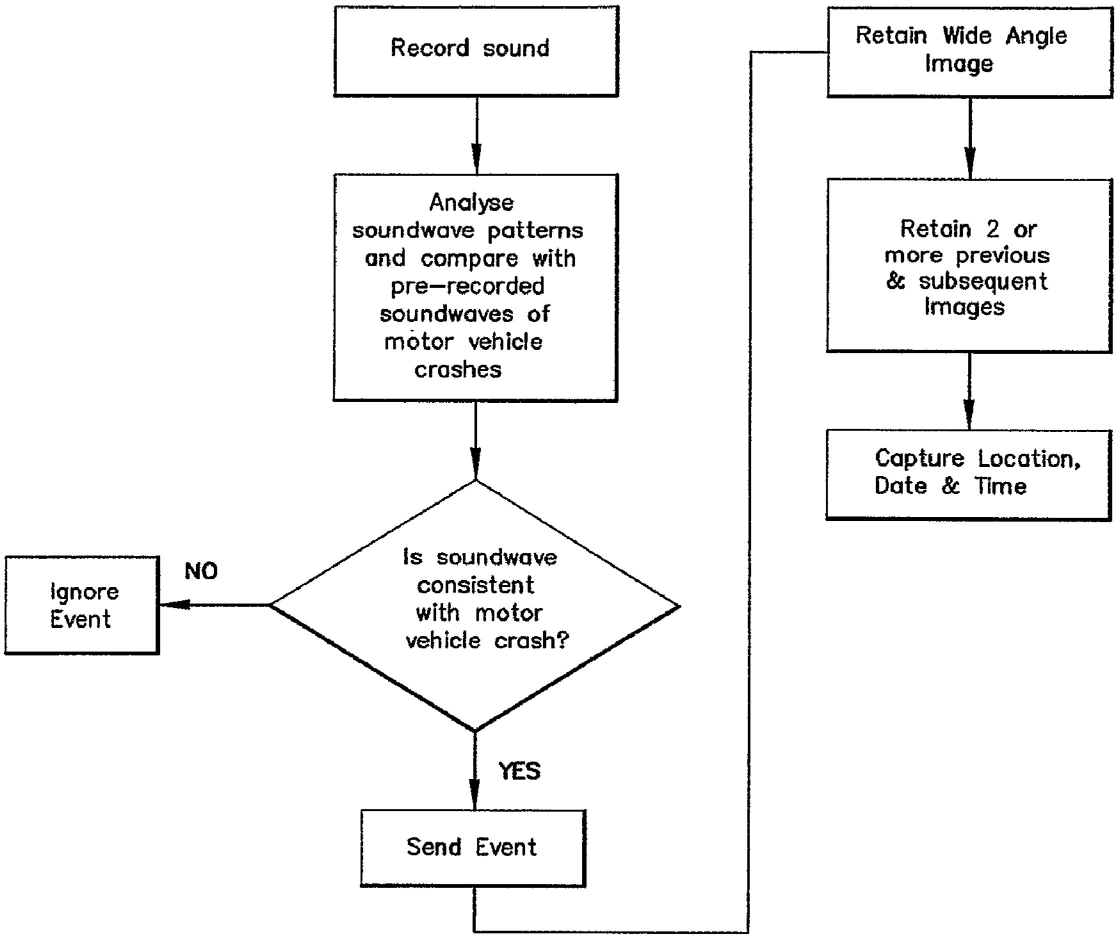
FIG. 6 is a flow chart illustrating operation of another embodiment of the invention.

FIG. 6 is a flow diagram of a further embodiment of the invention in which an accident is detected and which enables images of the accident to be captured to provide evidence of the accident.

Referring firstly to FIG. 1, a directional microphone 100 is mounted on the pole 18 or in any other suitable location for monitoring ambient sound from the intersection. The microphone 100 is connected to the processing section 56, as is shown in FIG. 3. The processing section 56 is provided with sound wave patterns indicative of the noise of an accident, and these sound wave patterns are stored in memory to provide reference patterns for determining if an accident has occurred at the intersection. The microphone 100 continuously monitors the ambient sound from the intersection and the sound wave pattern detected by the microphone 100 is processed and continuously compared with the sample sound patterns stored within the processing section 56.

As explained with reference to FIG. 6, if the comparison with the ambient sound received by the microphone 100 is not consistent with the stored patterns in the processing section 56, then the event is ignored and images captured by the cameras 20 and 30 are not passed to the hard disc 58. If the microphone 100 detects a sound pattern consistent with one of the stored sound patterns within the processing section 56, this is taken as an indication of an accident within the intersection and an event is triggered, as is shown in FIG. 6. This causes the wide angle image captured by the wide angle camera 20 to be transferred to the hard disc 58. Also, at least two images prior to that image are also transferred to the hard disc 58, and two images subsequent to that image are transferred to the hard disc 58. Thus, the sound pattern indicative of a traffic accident causes the retention of images in the same manner as a red light violation or speed violation, as in the earlier embodiments. These images may be captured concurrently with or instead of speed violation images or red light violation images. Thus, the facts of the event are therefore captured and recorded, which can provide information as to the nature and cause of the accident in any further proceedings.

It will be apparent from the above description that the processor 50 forms the functions of processing the images taken by the camera in order to determine the red light phase and also to determine whether a vehicle is present in the intersection during the red light phase, as well as processing ambient sound to determine whether an accident has occurred, and then identifying the relevant images for transfer to the hard disc 58. Although in the preferred embodiment a single processing section 56 is provided to perform all of these functions, the processor 50 could include several separate processing sections, each of which performs only one or some of the functions referred to above. The processor may therefore effectively include a single board in which all processing is performed, or a number of separate processing boards which are suitably coupled together if necessary to perform of the above-mentioned functions.

The images captured by the cameras can also be analysed to enable vehicles to be classified. That is, by image analysis, the type of vehicle, ie. car, truck, motorcycle, etc., can be determined to provide some statistics on the nature of the vehicles which are using that particular part of the roadway. Furthermore, the preferred embodiment of the invention may also be able to determine a particular traffic light sequence which may allow vehicles to travel through the intersection, such as turning arrows, flashing red or amber lights indicating that a vehicle should approach the intersection with caution but may cross the intersection during the period of the flashing lights, so that those traffic signals do not prompt a violation to be recorded.

In a further embodiment the invention is also applicable to detecting traffic violations which relate to failure to pay at tollways or tollbooths associated with a roadway. In most modern tolling systems, vehicles carry electronic devices which are automatically detected and recorded when the vehicle passes a toll station on the roadway. In conventional systems a single photograph of a vehicle passing the tollway is captured to enable the vehicle to be identified if the electronic device is not detected. In the present embodiment of the invention, the cameras as arranged in a similar as described with reference to the earlier embodiments to capture a sequence of photographs continuously as in the earlier embodiments. In the event of an electronic device not being detected, the time of detection is recorded via the GPS system as in the earlier embodiments, and the sequence of images associated with that violation are therefore retained as in the earlier embodiments, to provide evidence of the infringement and also to enable the vehicle to be identified. This embodiment has particular advantages in tollbooth situations, because in some instances it is very difficult for a single photograph taken from a tollbooth station to properly identify a licence plate of the vehicle. The fact that the present embodiment enables a sequence of photographs to be taken, which include photographs of the actual violation, together with photographs prior to and following the violation, provides more images from which the vehicle number plate can be identified.

The preferred embodiment of the invention also provides a method and system for processing violations which are captured by the systems described with reference to FIGS. 1 to 6, and the tollway violations described above. The embodiment of FIGS. 7 to 9 enables violations to be processed by a relevant department, such as a police department, information to be assembled for preparation of fines or court proceedings, and also for monitoring and review by authorised users of the system, such as police department, court officials, city officials and the like. The system also enables individuals who have been forwarded a violation notice to inspect the images associated with that violation should they so desire.

Figure 7:
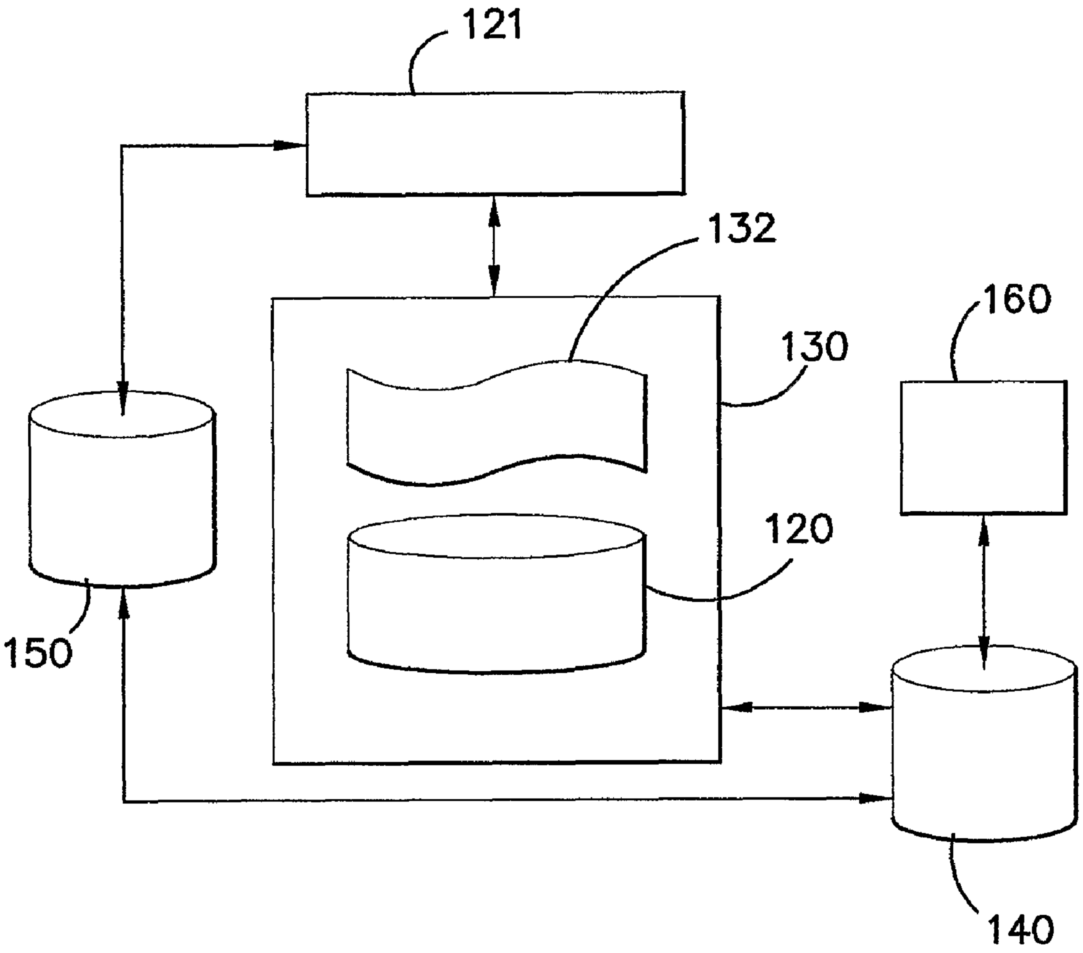
FIG. 7 is an overview of a violation processing system of the preferred embodiment.
Figure 8:
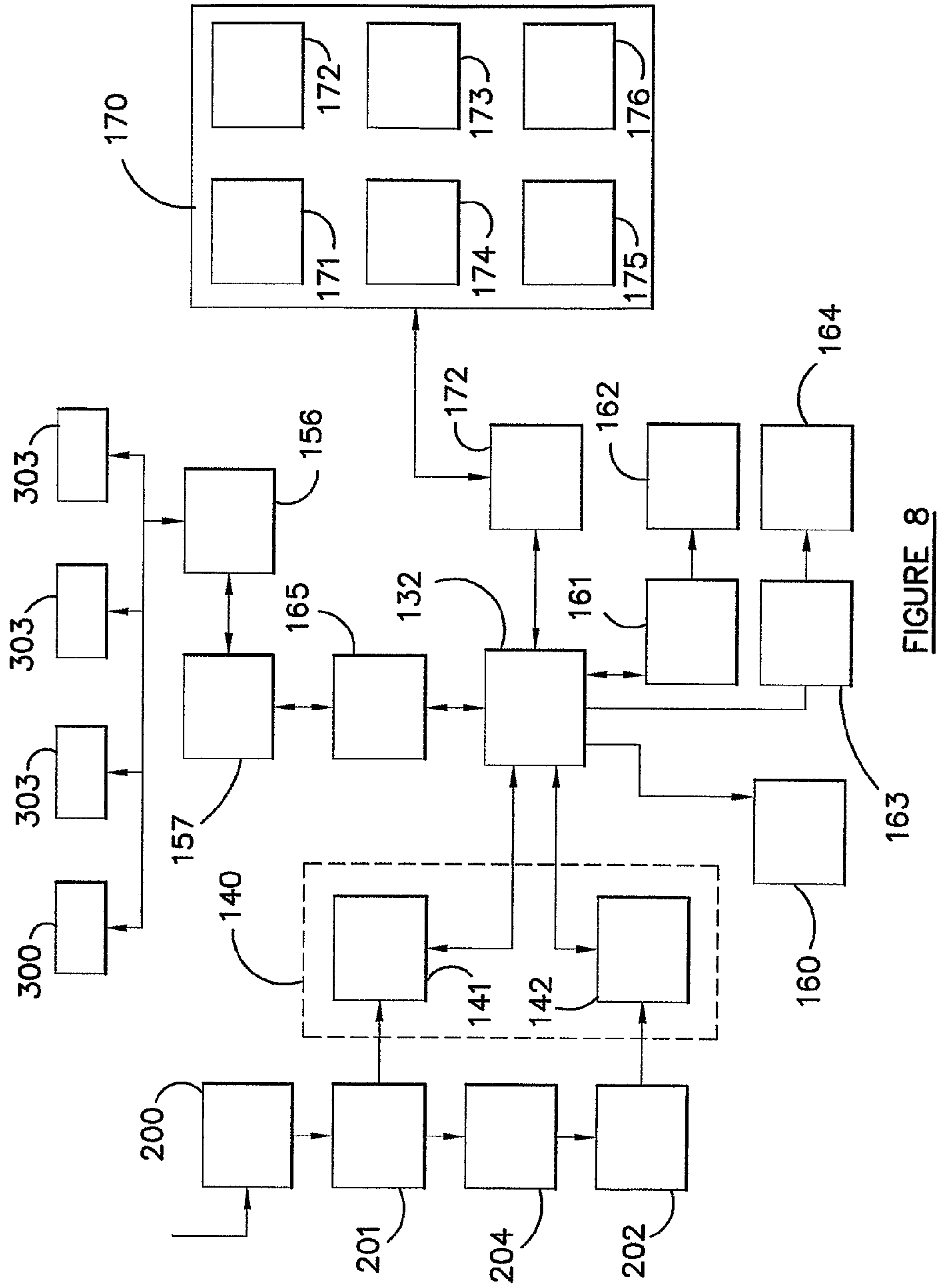
FIG. 8 is a block system module diagram of the embodiment of FIG. 8.
Figure 9:
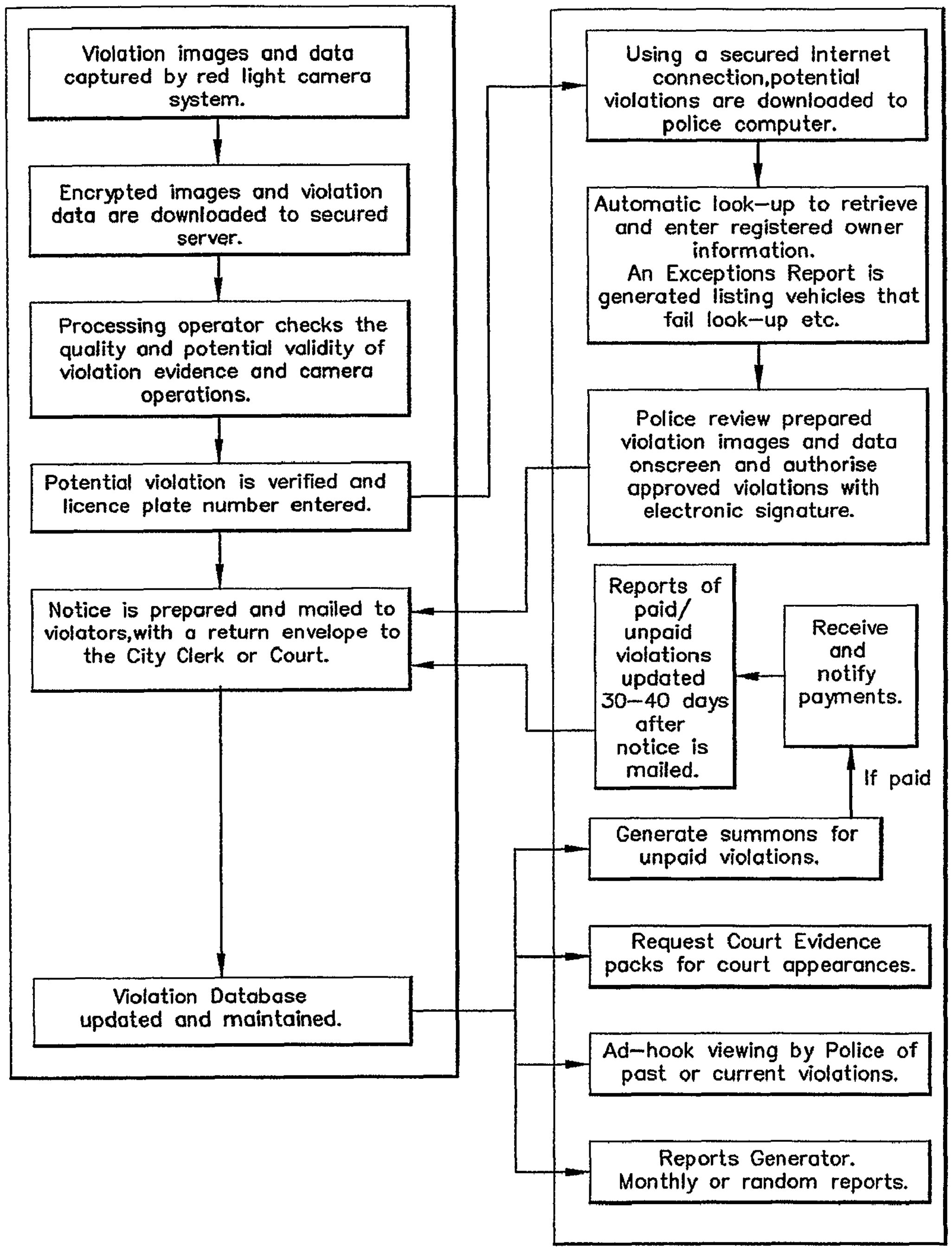
FIG. 9 is a flow chart illustrating operation of the embodiment of FIG. 7.

The embodiment of FIGS. 7 to 9 provides real time communications between all field systems of the type described with reference to FIGS. 1 to 6, and one or more central databases 120 (see FIG. 7) and all users and managers concurrent access to data by different users. Once data is stored within the system, the only thing that changes is its status, eg., the status of a particular set of data may be altered from "pre-verified" to "accepted", at which point it becomes available for police authorisation. The system may be accessed by different classes of authenticated users (including for example, personnel associated with the operating system, client personnel such as police officers, court officials, verification operators and city managers, or the individual citizens who may wish to view evidence of their traffic fine via the Internet). Each user is authenticated at login and is automatically granted a particular range of privileges as appropriate to their role. The system includes a web server 121 which acts as the main entry point for all external requests for information and updates and allows browser-based, interactive access for authenticated users in any location. This allows a distributed infrastructure which can be accessed globally with full authenticated security. The database 120 is contained within a violation processing engine 130 which also includes business logic, represented by reference 132, which relates to the protocols and manner with which different clients may wish to deal with information concerning a violation in their particular jurisdiction. For example, a single database could be utilised for storing and processing violations captured in a number of different cities. Each of those cities may require a different protocol for forwarding fine notices, for prosecution purposes or otherwise. The violation processing engine therefore enables each of the specific users to process data relating to their particular violations in a specific way applicable to them. Thus, a single database or set of databases can be utilised without the need to specifically tailor a specific database for each individual user's requirements. Thus, the violation engine 120 contains the broad range of business logic necessary to perform traffic camera office operations in respect of processing red light running, speeding and toll violation evidence. These operations include:

- reviewing evidence (images and data) for each alleged event to identify or verify violation events that have breached the relevant authority's traffic law/traffic code;
- making verified violations available for authorisation—and possible electronic signature—by jurisdiction officials (usually sworn police officers);
- ticketing (ie., printing and mailing authorised warning letters, traffic fines/notices, or summonses);
- tracking fine payments;
- producing reports to users of the system;
- producing evidence for the courts relating to specific traffic violation or events, including all event images (that is, the multiple set of images captured by the cameras and obtained when an event is determined, and which show the scene of the incident, the vehicle license plate and also the driver ID or face if required);
- producing data sheets relevant to the event; and
- creating an electronic audit trail (in place of sworn chain of custody statements by officers that are required with film cameras).

An event server 140, which is preferably in the form of a large scalable database server, is provided and onto which primary evidence (ie., the images and data captured by the system of FIGS. 1 to 6) is loaded. The event server 140 received the data from the link 60 in FIG. 3 by way of Internet connection or in any other suitable manner. The event server maintains the integrity of all primary evidence because, for example, any image modification (such as gamma correction) is only performed on duplicate images that have been received from the server for processing. A report server 150 is connected to the event server and also to the web server 121 to enable memory intensive reporting requirements. An archiver 160 is also provided which purely rechecks the status and age of all events stored on the event server, against the relevant client's agreed business rules, and uses this information to remove outdated data and images and archive them.

FIG. 8 is a systems module diagram of the system described with reference to FIG. 7. The module of FIG. 8 includes a module 200 for receiving data and images from the site computers 40 and, as previously described, this information may be transmitted by way of Internet connection or by any other suitable method. The module 200 therefore receives information relating to a particular customer which may be a city authority, or the like. The data is received by an interface 201 which converts the data, if necessary, into a particular format which can be read and processed by the remainder of the system of FIG. 8. The data from the various systems is automatically regularly polled so that the violations images are received by the system of FIG. 8. The images and data are then supplied to the event server 140 from event interface 201, data interface 202, which in turn receives data transformed by module 204. The event server 140 includes an image server module 141 and a data server module 142 which are connected to the business process module 132 which contains the protocols relating to a particular customer to enable the information relating to a violation to be compiled and treated in accordance with the business rules of that particular customer. Thus, images and data may be archived by the archiver 160 in accordance with the rules of a particular customer.

Once images of a particular event have been inspected and a violation deemed to have occurred, information relating to the owner of the vehicle involved in the violation needs to be obtained. This is received from the relevant authorities such as a vehicle registration authority 300. The database at the authority 300 is therefore automatically interrogated by the system of FIG. 8 to provide the license plate details of the vehicle involved in the violation. If necessary, the data is transformed by module 165 into a format which can be understood and read by the database at the authority 300. Once the information relating to the data has been transformed, it is supplied to the authority 300 via interface module 156 after being formatted into a customer format in module 157. Details relating to the owner of the vehicle are retransmitted back via module 156 and are transformed by module 165 back into a format which will be understood by the system of FIG. 8 and into the relevant format required by the specific user. The information may be then forwarded to a print server 161 for printing images of the event and to a notice module 162 which creates a notice for printing, such as a fine or the like, which is forwarded to the owner of the vehicle. The business module 132 is also connected to a report generator module 163 which enables specific reports to be generated relating to the infringement activity detected by various systems within the user's infrastructure. Standard reports according to the requirements of a specific customer may then be generated by module 164. Web interface 170 enables authorised users and civilians to access the system so as to process violations or view a violation relevant to a particular citizen. The web interface 170 enables a user to logon to the system via module 172. The user's authentication code and logon details will therefore define the access the user has to the system of FIG. 8. For example, if an authorised officer, to determine whether a violation has occurred, such as a police officer, town clerk or other authorised personnel, logs on, that person will be able to access images relating to the jurisdiction for which that person has responsibility, and determine whether a violation has occurred from those images. For example, the authorised person logs on at step 171 and queries all events in that person's jurisdiction at step 172. The events are then compiled and displayed on the user's screen at step 173 so that the user can determine whether a violation has occurred. If this is the case, the registration details of the vehicle are determined by accessing the authority 300 in the manner previously described. As explained hereinafter, requests for registration details may be batched for automatic look up at a later date. An event report, such as a summons, fine or the like, may then be generated and forwarded to the vehicle owner, as also previously described. The web interface 170 also enables the authorised person to then go to the next event 174 and continue the process until all recorded events have been processed and verified. At step 175, the images relating to a particular event can be inspected in turn to observe the sequence of images which relate to the event and also the details of the license plate of the vehicle concerned. Module 176 enables an update of the system to show that fines have been paid or that no activity has occurred and that court proceedings should be instigated or any other activity which may be required by a particular customer.

The business process module 132 may also be connected to other authorities, collectively shown at 303, which may need to interrogate the system to determine particular events applicable to them.

Thus, all information stored in the event server 140 may be accessed dynamically by any authenticated user according to the controls inherent in their authentication. For example, once violation images and violation data have been stored in the event server, they are available to any authenticating process officer for verification purposes. Once the operator has logged in and defined their verification request, the system displays images and data on their PC screen. Operators can click onto an image to enlarge if it is required. They may also request that a full image set (eg., all license plate images for a particular violation) be furnished if required. License plate details may be supplied to the event server by the field OCR systems, or may be entered or edited manually by the operator at this stage.

Operators may accept/reject evidence for a particular event or end it or mark it for review by a supervisor or another operator. Only when evidence meets the client's legal and business rules are violations accepted and further processed by the system.

Verified violation events (containing the license plate number of the vehicle) are batched for automatic look-up at the authority 300 which automatically populates the registered owner information on the appropriate notice which is presented for authorisation so that all relevant information is available for review by the authorising officer.

Authorised users may also have secure, dynamic, browser-based access to data held in the system (at their particular privilege level) for any computer with Internet access. They may login using their assigned user name and password—and additional security, eg. an USB token (which is inserted into the appropriate port of the computer), request immediate access to evidence for defined classes of verified violations/particular violation event, for immediate display on screen, accept or reject the violation with a single click, request image enlargement, request multiple image set images for each display image and scroll through these, authorise issue of the relevant letter notice and electronically sign if desired, request standard system reports by the module 164.

The system generates a print file for printing and mailing as per the modules 160 and 162 which may be warning letters, fine notices, notices to appear or summonses. These documents may display relevant violation images if required, and are customised to meet the customer's legal requirements. All mailing details are automatically recorded by the system.

Standard reports include, for example, monthly reporting for:

the total number of violations recorded for the month;

the number of letters/notices of violation issued;

the number of letters/notices of violation not issued;

break down by reason for non-issuance;

the number of camera operating hours; and the number of violations recorded per camera operating hour.

As described with reference to FIG. 9, the database may be updated and maintained to show that various fines which have been issued have in fact been paid and therefore can be struck out of the system. The system may also generate official summonses for unpaid violations, as previously described, and also compile evidence packs for use in court, allow ad hoc viewing by police departments of past or current violations, and report on a monthly or random basis to relevant authorities.

An alternative embodiment to that shown in FIGS. 1 to 4 is shown in FIGS. 10 to 20.

Figure 10:
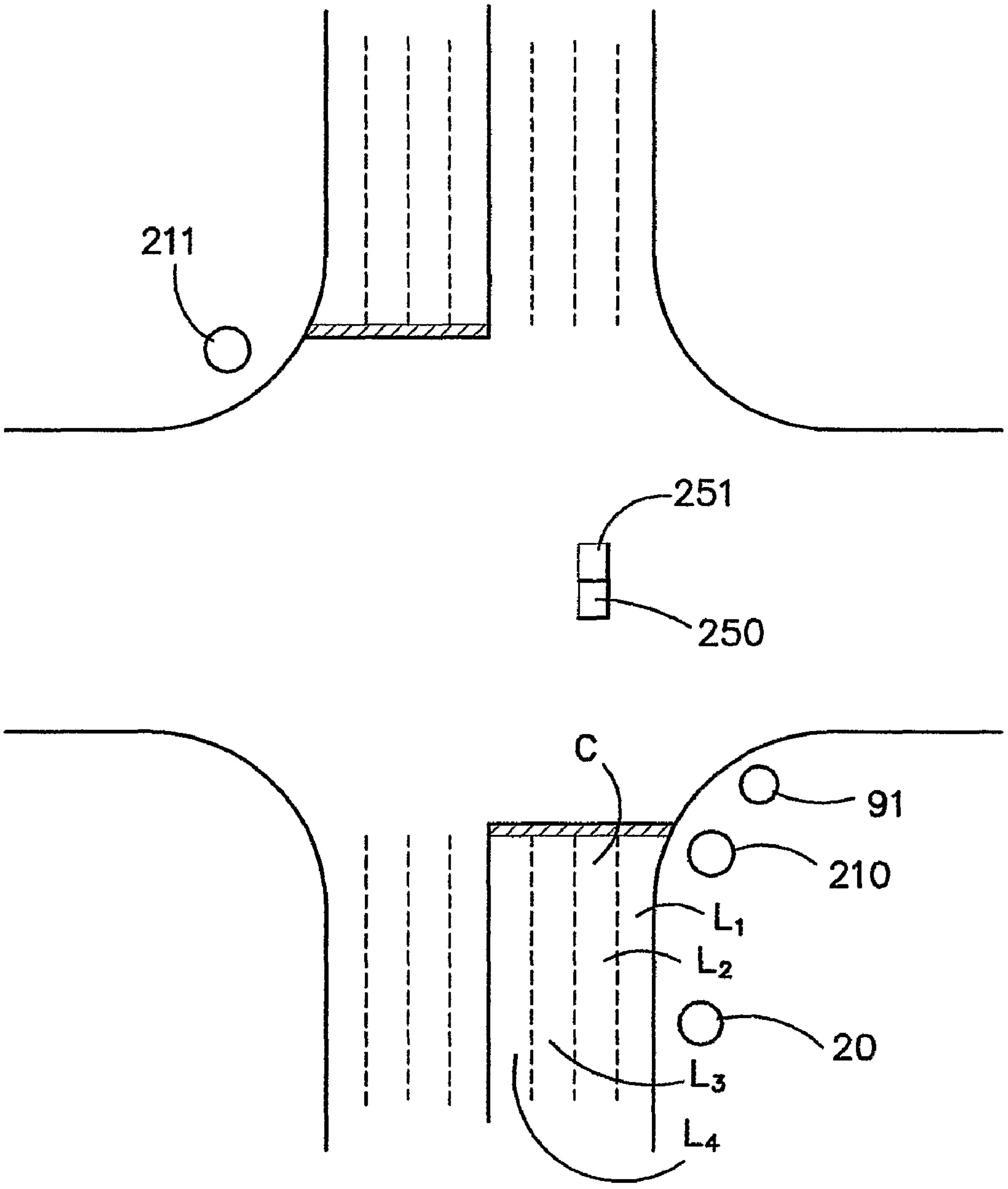
FIG. 10 is a plan view of an intersection having a traffic violation detecting system according to a further embodiment of the invention.

Referring to FIG. 10, an intersection is shown which has a road C which may contain four lanes L1, L2, L3 and L4. It should be noted that the intersection shown in FIG. 10 is applicable to right hand side motor systems such as that present in the USA.

The system includes a wide angle camera 20 which is the same as the wide angle camera 20 previously described with reference to FIGS. 1 to 4, for capturing images of the entire intersection. A domed camera assembly 199 having a fixed camera 210 is provided for capturing narrow angle images of each of the lanes L1 to L4 in which a violation occurs. Thus, in this embodiment, instead of providing a separate camera for each of the lanes, only one camera is provided to monitor a plurality of lanes. The intrusion of a vehicle into the intersection when a red light phase of a traffic control signal is present may be monitored by camera 91 which is the same as the camera 91 described with reference to FIGS. 1 to 4. However, in this embodiment, it is preferred that the vehicle detection be performed by ranging lasers 250 and 251, which will be described in more detail hereinafter.

A further camera 211 may be provided for capturing images of the face of a driver when a violation occurs. The camera 211 may be identical to the camera 210 and operate in the same manner or, alternatively, a plurality of separate cameras for each of the lanes L1 to L4 can be provided for monitoring each of those lanes to capture images of a driver when a violation occurs in any one of those lanes.

The cameras 20, 210, 91 and 211 are mounted on poles in the same manner as the earlier embodiment. The ranging lasers 250 and 251 are also mounted on poles so as to be located above the intersection, as will be described in more detail hereinafter.

Figure 11:
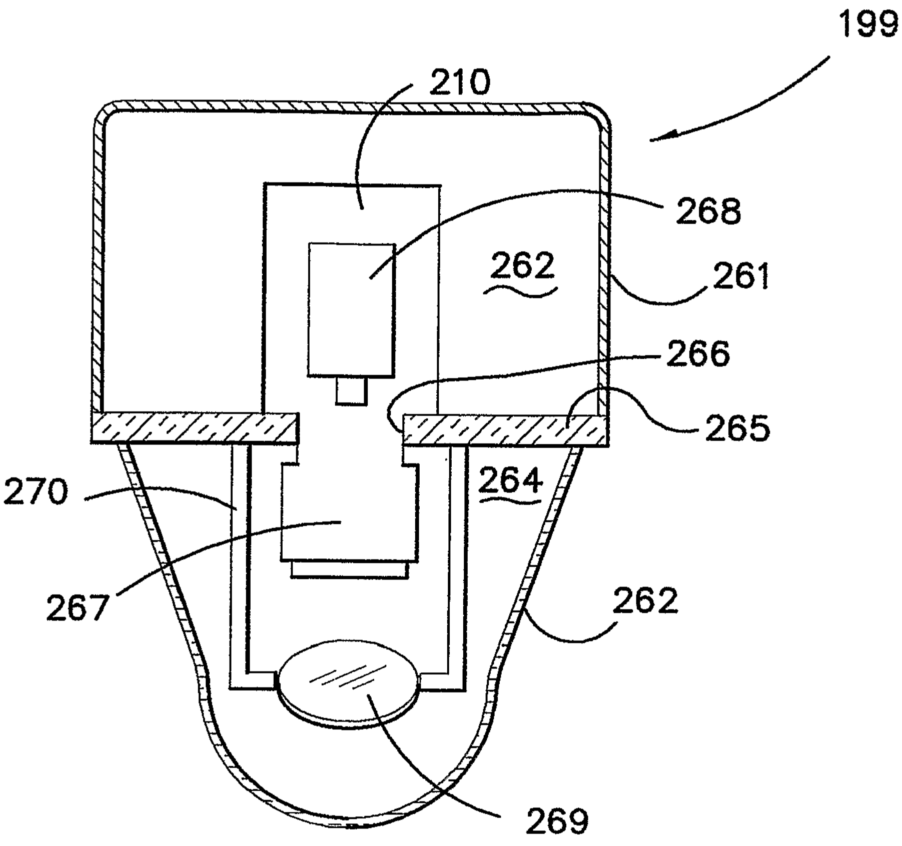
FIG. 11 is a view of a camera used in the embodiment of FIG. 10.

FIG. 11 shows the assembly 199 which has a housing 261 which includes a dome 262. The housing 261 is divided into a cool chamber 263 and a warm chamber 264 by a Peltier heat transfer layer 265. The layer 265 has an opening 266 and the camera 210 is provided with a lens 267 which locates in the warm chamber 262 and either projects through the opening 266 to be in optical communication with the camera 210 or is in optical communication with the camera 210 through the opening 266. An infrared laser 268 is mounted on the camera 210 for producing infrared illumination to illuminate a respective one of the lanes L1 to L4 with infrared illumination so that the illumination can reflect from the lane and vehicles, etc. in the lane back to the camera 210 so the camera can capture images of the lane and any vehicles in the lane.

A moveable mirror 269 is provided in the dome 262 for reflecting illumination from a respective one of the lanes L1 to L4 to the camera 210 so that images can be captured. The laser 268 points at the mirror 269 so that the illumination produced by the laser is also directed to the lane to which the mirror 269 points so the laser 268 provides illumination to, that lane and reflected illumination from the lane is reflected by the mirror 269 to the camera 210 to capture the aforesaid images. The camera 210 includes a CCD array 301 (see FIGS. 16 and 17) and the camera generates some heat during operation. As the temperature of the CCD array increases, there is a proportionate increase in the amount of noise in the image captured by the camera 210. Alternatively, if the camera lens and mirror are in a cool environment, the chance of fog developing on the surfaces increases. The Peltier layer 265 which is located between the camera and lens, transfers heat away from the camera and, in particular, the CCD array of the camera to the warm chamber to thereby keep the environment of the lens 267 and the mirror 269 warm. This has the dual effect of creating clearer images on the CCD array and preventing fog from forming on the surfaces of the lens and mirror.

Figure 12:
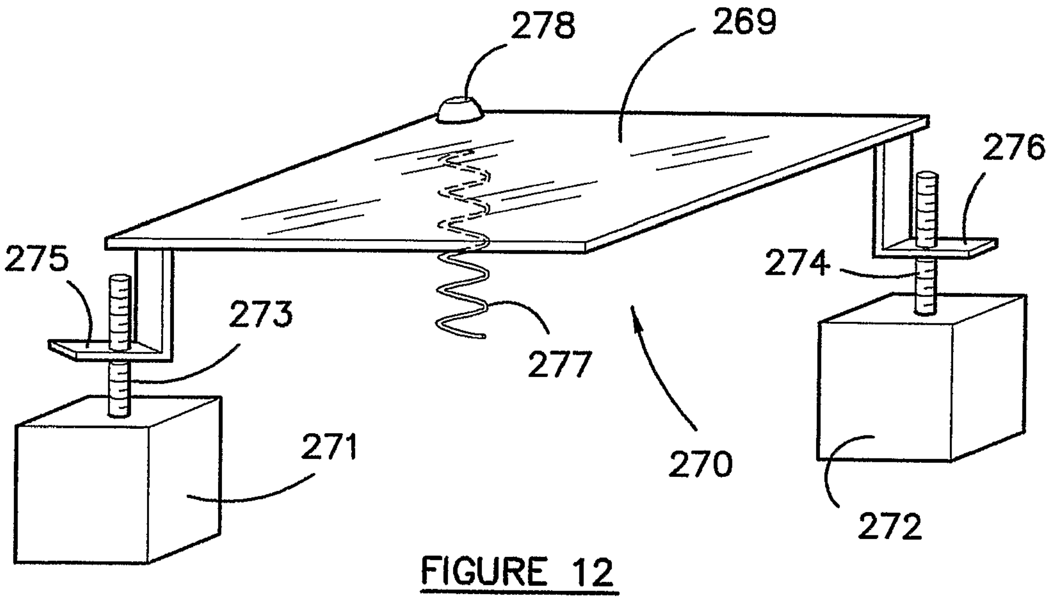
FIG. 12 is a view of part of the componentry of the camera of FIG. 11.

The mirror 269 is moved by a mirror rotation and tilt mechanism schematically shown at 270 in FIG. 11. FIG. 12 shows one embodiment of the mechanism which comprises a first motor 271 and a second motor 272. The motor 271 drives screw threaded shafts 273 and 274 which are screw threaded to lugs 275 and 276, which in turn are connected to mirror 269. A fixed ball joint 278 is connected to one of the other corners of the mirror 269, and a spring 277 is provided for biasing the mirror by contacting the mirror at about the midpoint of the triangle formed by the corner at which the ball joint 278 is connected and the corners at which the shafts 273 and 274 are provided. The other end of the spring 277 is fixed. When the motors 271 and 272 return the lugs 257 and 276 to a home position, the spring 277 biases the mirror 269 to its own home position. In this embodiment, the mirror is preferably rectangular and the lugs 275 and 276 are connected to opposite corners of the mirror and the ball joint 278 to one of the other corners of the mirror. The motor 271 produces tilt of the mirror 269 and the motor 272 produces pan of the mirror 269. The motors 271 and 272 are controlled by processor 56 when a violation is detected, so that the mirror is moved to aim at the lane L1 to L4 in which the violation occurs. Thus, that lane is illuminated with illumination from the laser 268 and reflected illumination is reflected by the mirror 269 to the camera 210 so images of the violation can be captured. If the image captured by the camera 210 needs to be enlarged, the lens 267 can zoom to the appropriate degree.

As will be apparent from a consideration of FIG. 11, as the motors are activated, the screw threaded shafts 273 and 274 are rotated, allowing either or both corners of the mirror 269 to be raised or lowered. This will allow the mirror to be aimed in the appropriate location. A feedback system (not shown) may also be provided to let the processor 56 know the position of the mirror. The feedback system can also move the mirror back to a home position so as to minimise the amount of movement necessary to point at any one of the lanes so that the mirror can be quickly moved when a violation occurs, so the violation is captured by the camera 210.

Figure 13:
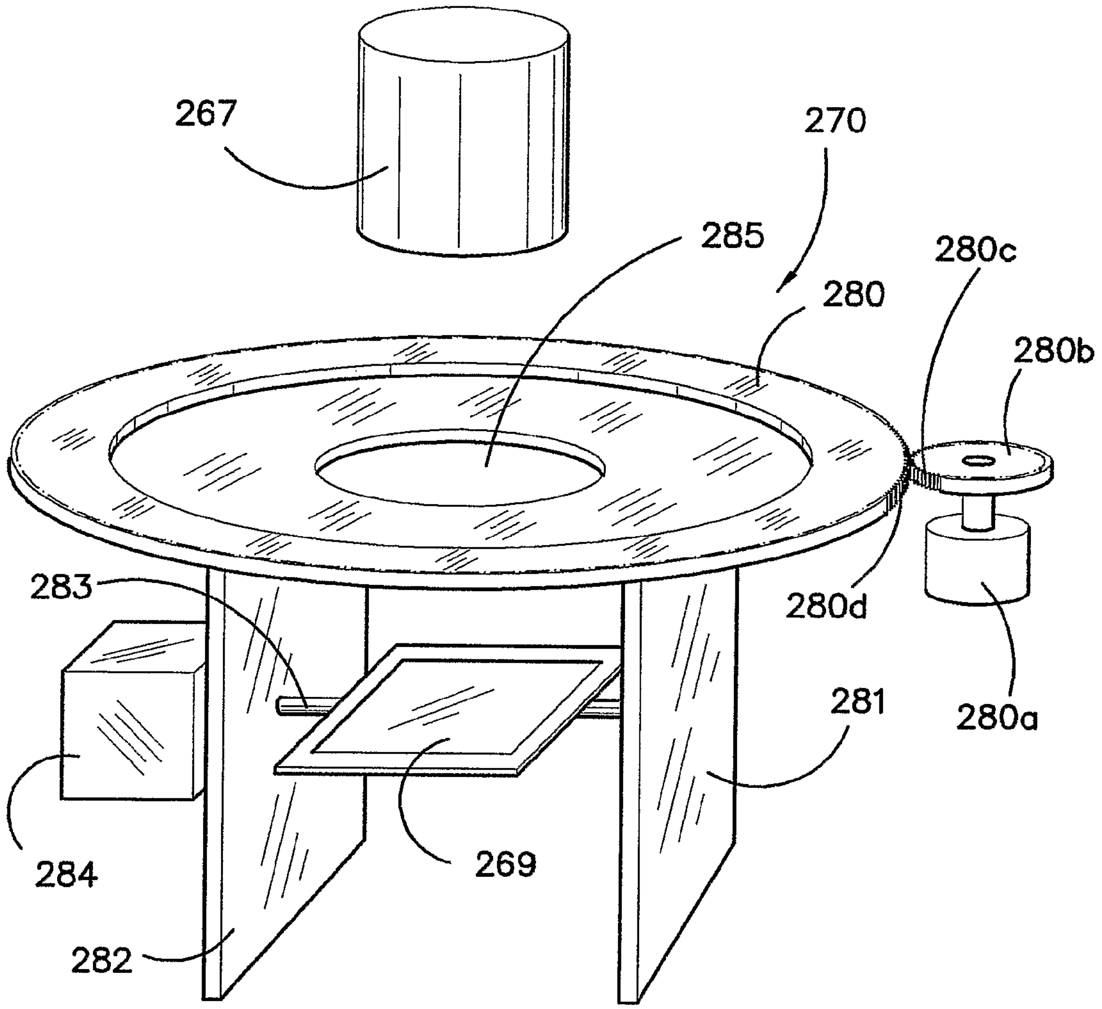
FIG. 13 is a view of an alternative arrangement that shown in FIG. 12.
Figure 14:
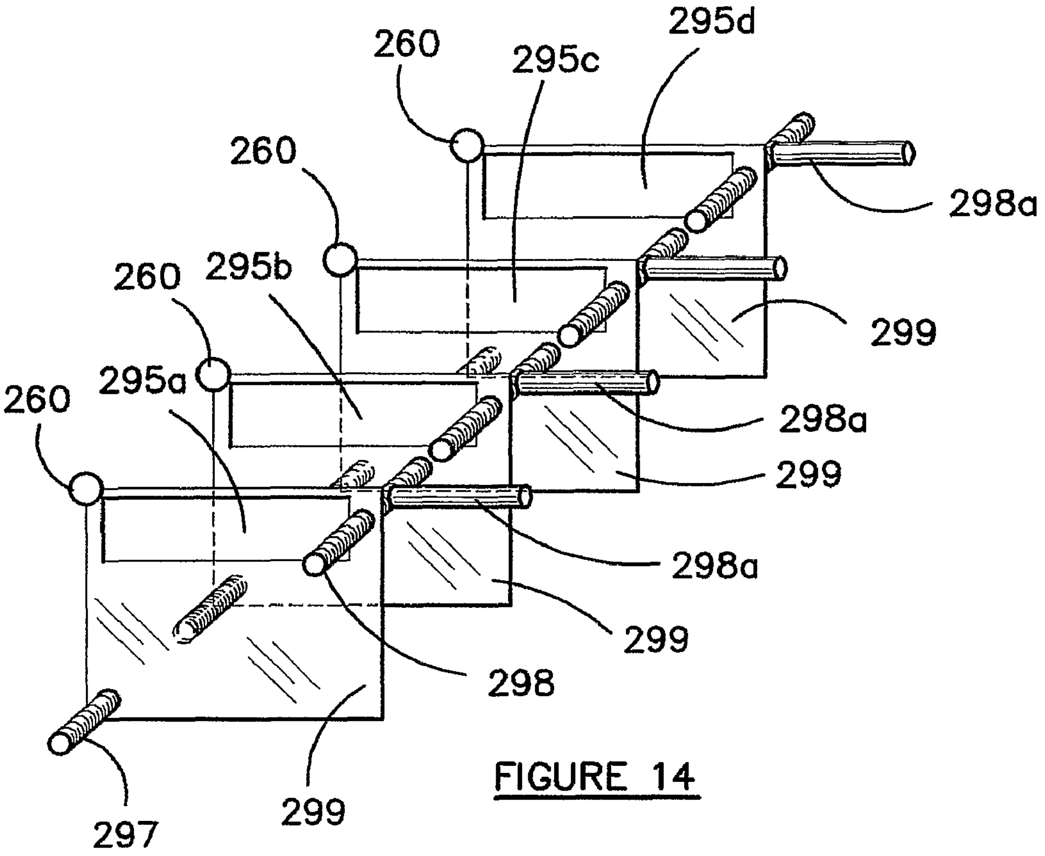
FIG. 14 is a view of a fixed mirror system arrangement according to one embodiment.

In a further embodiment shown in FIG. 13, the mechanism 270 comprises a pan disc 280 which has a pair of supports 281 and 282 in which mirror 269 is journaled by axle 283. The axle 283 is rotated by motor 284. The pan disc 280 has a central hole 285 through which the camera lens 267 and camera 210 can view the mirror 269. The disc 280 is rotated by a motor and motor shaft 280*a* which drives a gear 280*b* which has gear teeth 280*c* and mesh with gear teeth 280*d* on the disc 280. In another embodiment, the disc 280 could be driven by a belt which in turn is moved by a motor and pulley arrangement (not shown). The disc 280 is rotatable to provide pan action and the motor 284 can tilt the mirror 269 to provide tilt action.

The mechanism shown in FIG. 13 provides a wider range of movement than that shown in FIG. 12 and therefore may be more suitable for particularly wide roads having a larger number of lanes.

Once again, the tilt motor 284 and the rotation of the pan disc 280 are controlled by the processor 56 when a violation is detected so the mirror points at the appropriate lane so the violation can be captured by the camera 210.

FIGS. 14 to 17 show a still further embodiment in which a fixed mirror system formed by a plurality of mirrors 295*a* to 295*d* are used in place of the mirror 269 in the embodiments of FIGS. 12 and 13. This has the advantage that it is not necessary to move the mirrors after installation and proper calibration.

Figure 15:
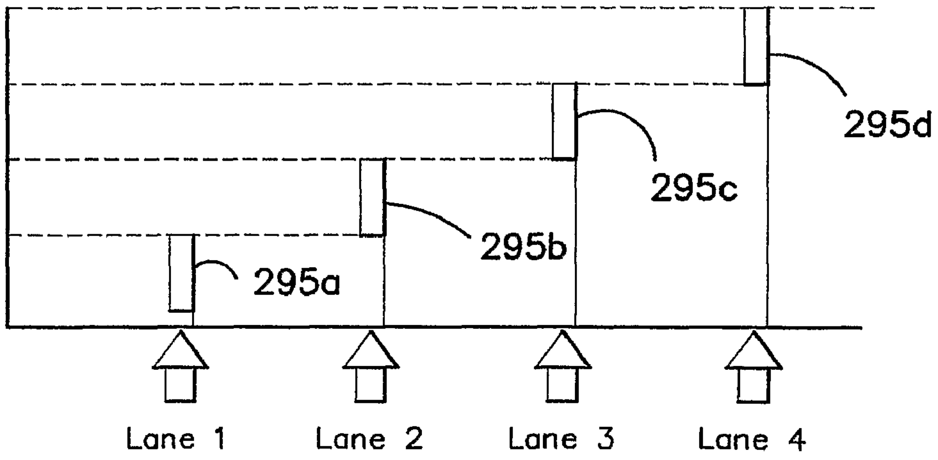
FIG. 15 is a view of the mirrors of FIG. 14 in plan.
Figure 16:
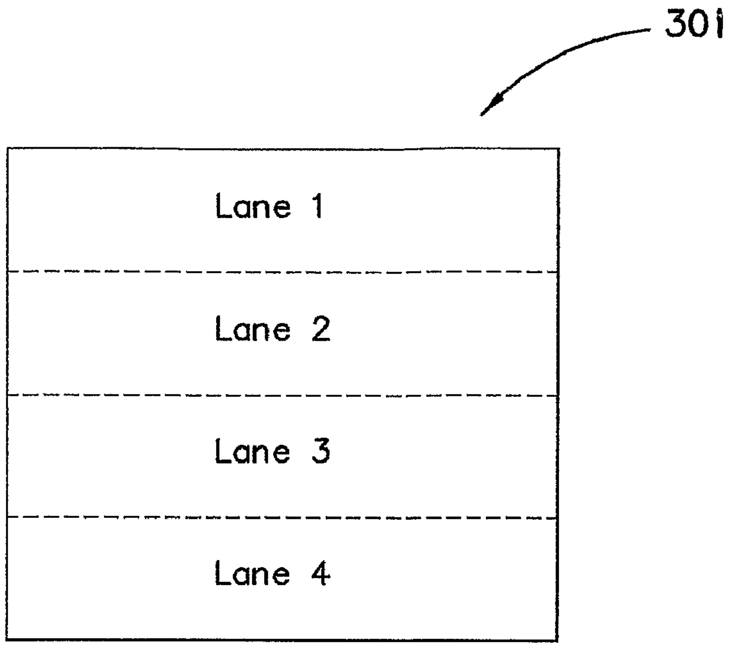
FIG. 16 is a view of a pixel array of a camera used in the preferred embodiment.
Figure 17:
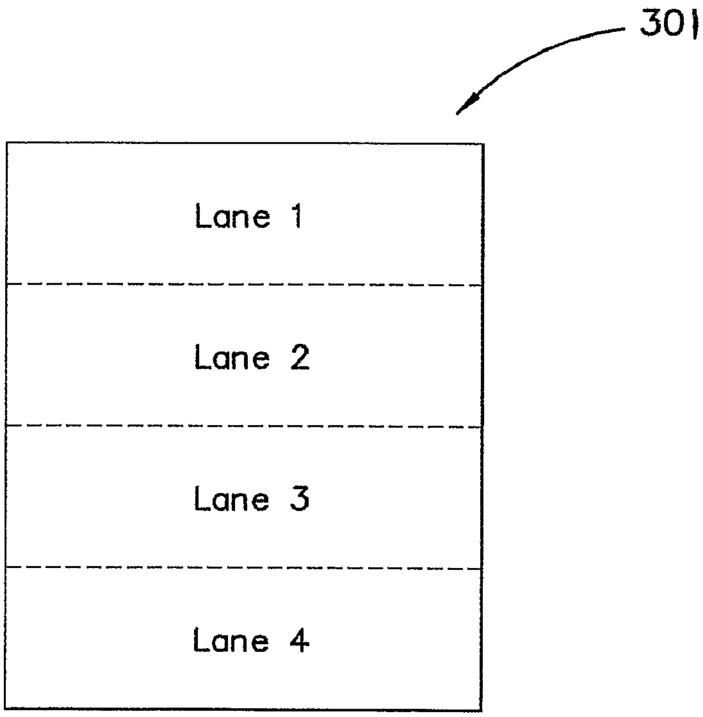
FIG. 17 is a view of the same array as in FIG. 16 except rotated 90°.

Each of the mirrors 295*a* to 295*d* are mounted on a respective panel 299. As is apparent from FIG. 14, each of the mirrors 295*a* to 295*d* are separate from one another. However, the mirrors 295*a* to 295*d* could be joined together to form an integral mirror in which the mirrors 295*a* to 295*d* are angled with respect to one another to reflect light in the appropriate direction to images the lanes L1 to L4. Each of the panels 299 is provided with a screw threaded shaft 297 and 298 in opposed corners, and one of the corners of the panels 299 between those opposed corners is fixed, as shown by reference 260. In order to adjust the position of each of the respective mirrors 295*a* to 295*d* to properly calibrate the alignment of the mirrors, the shafts 297 and 298 are rotated by motors (not shown) to angle the mirrors so that each of the mirrors reflects the image from one of the respective lanes L1 to L4 onto a portion of the CCD array 301 of the camera 210. As an alternative to providing motors to rotate the shafts 297 and 298, the shafts may be provided with a handle 298*a* so the respective shafts can be manually rotated to thereby adjust the alignment of the mirrors 295*a* to 295*d*. The CCD array 301 is preferably 1280×1024 pixels. FIG. 16 shows a CCD array in one orientation, and FIG. 17 shows the array rotated 90°. The mirror segments 295*a* to 295*d* are arranged to reflect light from the lanes L1 to L4 onto the CCD array 301, as identified by the references lane 1 to lane 4 in FIGS. 16 and 17. Thus, all of the lanes are simultaneously imaged on the CCD array 301 with a different part of the CCD array imaging each of the lanes. Since each of the lanes are all imaged on the CCD array 301, it is not necessary to move the segmented mirror arrangement 295 after it has been initially set up and calibrated, so as to properly reflect illumination from the lanes onto the CCD array 301 and therefore no movement of the camera 210 or the mirrors 295*a* to 295*d* is needed. The proper calibration and alignment of each of the mirrors 295*a* to 295*d* can be performed when the camera is initially set up by manual adjustment so that the respective reflecting portions 299 properly point at their respective lanes so that those lanes are imaged on the CCD array 301. For ease of illustration, FIG. 15 shows the mirrors 295*a* to 295*d* substantially parallel but, in practice, they will be slightly angled to properly point at their respective lanes. The processor 56 is programmed to know which parts of the array 301 relate to each of the lanes (or, in other words, which pixels of the array relate to each of the lanes) so that when a violation occurs in one of the lanes, the image created by those particular pixels is used to provide evidence of the violation. The image from the other pixels can be blocked out to preserve privacy of any other vehicle which may be imaged by those pixels. In other words, only the image at the relevant part of the CCD array is extracted to provide evidence of the violation.

The laser 268 produces absolute infrared light (non-visible to the naked eye) to act as an external illuminator for the purpose of making a number plate and face of a driver of the vehicle brighter for capture by the dome camera 210 and by the camera 211 respectively (if the camera 211 is of the same configuration as the camera 210). As will be apparent from the foregoing description, the laser will illuminate whatever the camera is viewing. As the surface of a number plate is highly reflective to coherent laser light, the effect is a much higher contrast and more detailed image for identification in low light conditions.

However, it should be understood that whilst it is preferred that the laser is mounted on the camera and views the same location as the camera via the mirror 269, the laser 268 could be mounted separately.

In order to determine when the red light phase of a traffic signal is present, this embodiment of the invention uses an inductive sensor 200 (see FIG. 19) which is clamped to the electric wire 201 which provides electricity to the red light 202 of the traffic signal. Thus, when electricity is supplied to illuminate the light 202, the magnetic flux which is created by flow of electricity through the wire 201 is sensed by the inductive sensor 200 and a signal is provided on line 203 to the processor 56 so that the processor 56 knows that the red light phase is active and present. When the red light phase finishes, electricity stops flowing and the signal on line 203 ceases so that the processor 56 knows that the red light phase is over. Thus, the processor 56 is provided with information showing when the red light phase of the traffic control signals is present, so that if a vehicle is present in the intersection and travelling along road C, the system knows that a violation has occurred.

As previously mentioned, the camera 91 can be used to provide an indication that the vehicle is in the intersection, as in the earlier embodiments. However, in the preferred embodiment of the invention, ranging lasers 250 and 251 are provided for detecting the vehicle in the intersection. These lasers also have the advantage that they can easily be adjusted to also provide an indication of the speed of the vehicle so that not only can a red light violation be detected, but also a speed violation detected.

Figure 18:
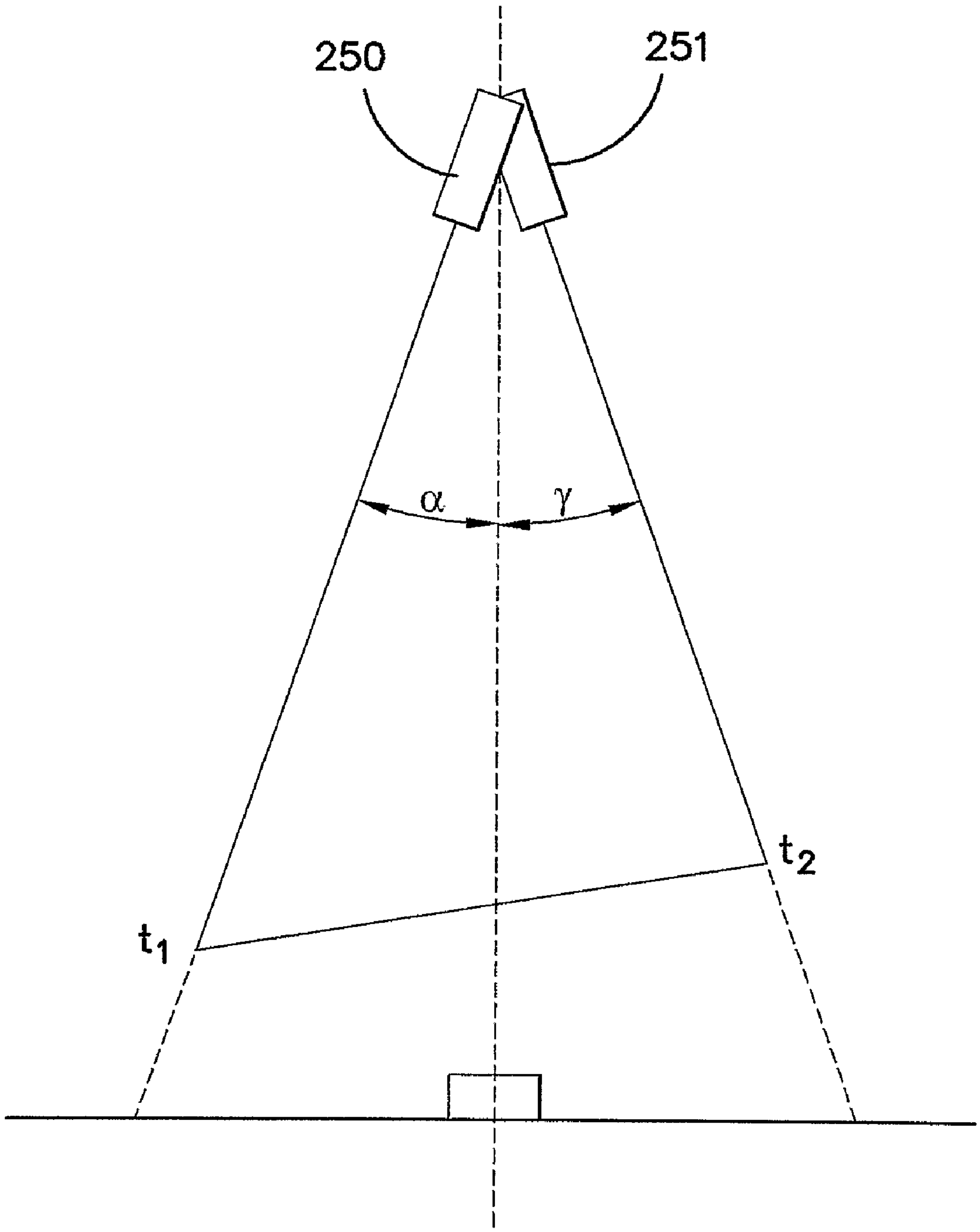
FIG. 18 is a view of a laser ranging system for detecting the presence of a vehicle according to this embodiment of the invention.
Figure 19:
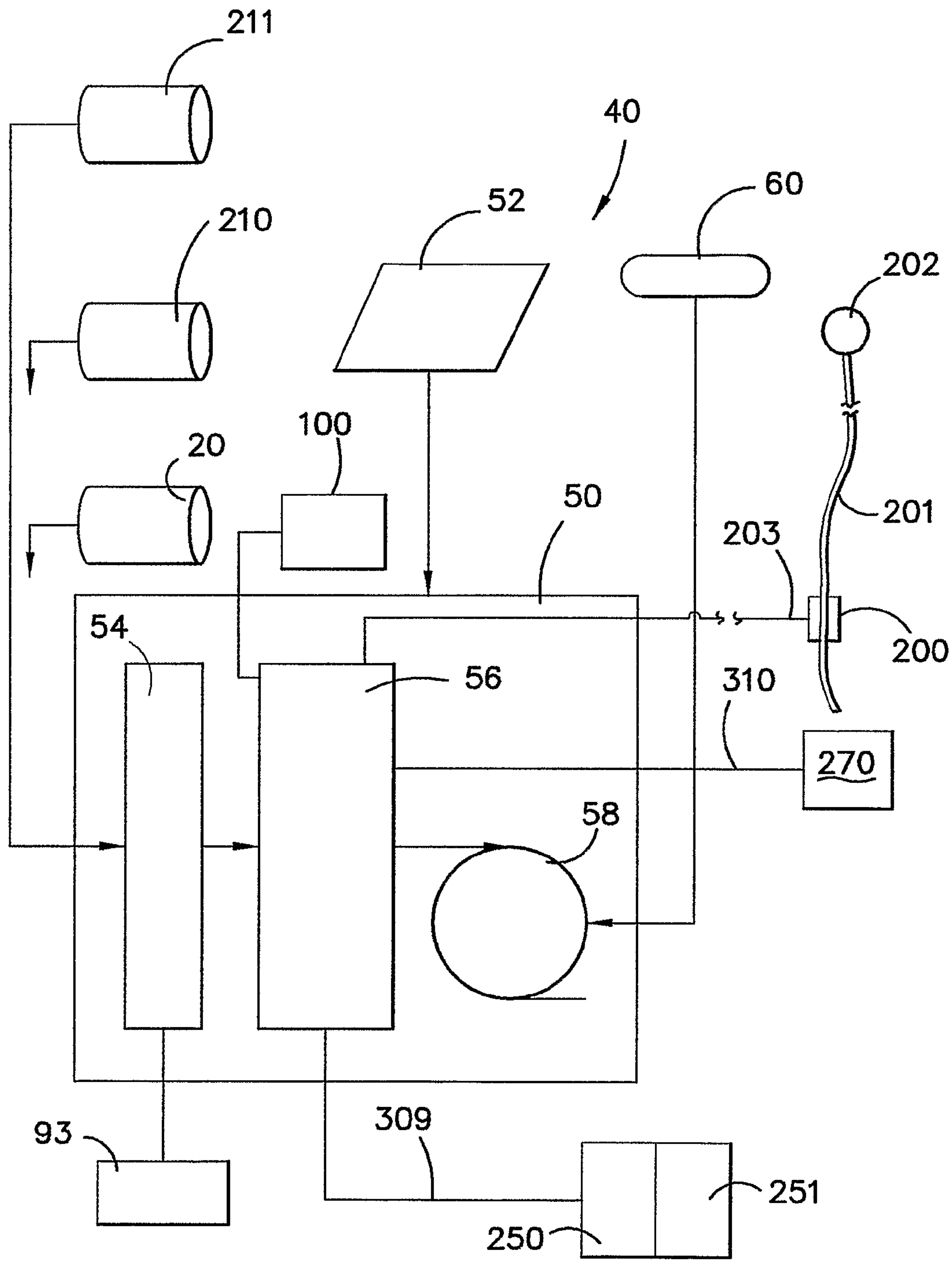
FIG. 19 is a block circuit diagram of site computer according to this embodiment of the invention.

As is shown in FIG. 18, the ranging lasers 250 and 251 are arranged above a respective one of the lanes L1 to L4. Thus, each of the lanes L1 to L4 is provided with two of the ranging lasers 250 and 251. The lasers 250 and 251 are angled at predetermined angles marked $\alpha$ and $\gamma$ in FIG. 18, which may be the same angle or different angles. The lasers are equipped with a ranging device, and hence are ranging lasers allowing them to measure the distance from the laser to any other point. These types of lasers are known and therefore will not be described in detail. However, suffice it to say that the lasers calibrate themselves to the fixed distance to the road surface and remember this distance. If the distance decreases, there is a signal output to indicate that an object (ie. a vehicle) is blocking the laser beam and the range is recorded. This calculation is done in groups of three pulses at a collective rate of approximately 100 times per second (300 pulses per second). Because the lasers are angled, there is a delay in signal output from the two lasers. The processor 56 measures the delay and a speed of the vehicle can therefore be determined. For example, if the beam from the laser 250 is broken at time T1 as shown in FIG. 18, and the beam from the laser 251 is broken at time T2, the time difference is obviously T2−T1. Since the angles α and γ are known, as is the height of the lasers above the roadway, then the speed of the vehicle can be determined by the time difference measurement.

Thus, by breaking the laser beams, not only is the presence of a vehicle determined, but also the speed of the vehicle can be determined if desired. When the laser beams are broken and the distance remembered by the lasers changes, the signal is output on line 309 (see FIG. 19) to processor 56 to thereby indicate that there is a vehicle in the intersection. If this coincides with the red light phase of the traffic control signal, as provided by the signal on line 203, the image capture process is triggered to thereby identify those images which relate to the violation of all of the images captured by the camera. Thus, only the images relating to the violation are separated out of the continuous images captured by all of the cameras and are stored for providing evidence of the violation and also evidence of the vehicle and person who committed the violation.

In the case of a moving mirror system as in the embodiments of FIGS. 12 and 13, as soon as the violation is detected, control signals are output from the process 56 on line(s) 310 (FIG. 19) to the mechanism 270 to control the mechanism 270 so that the camera via the moving mirror, points at the appropriate lane to capture the required images. Thus, all of the images captured by the camera 210 will comprise images of the carriage way at which the camera was pointed, images showing movement of the camera and then images of the lane in which the violation is occurring and of the violation. The camera 210 is focused at a part of the intersection so that, as soon as the violation is detected, there is sufficient time for the camera to move to the appropriate lane to capture images of the vehicle in the intersection whilst the red light phase is current to thereby provide evidence of the violation and evidence of the vehicle concerned. Those images are time and stamped recorded as in the previous embodiment, so that a particular set of images associated with the violation can be identified of all of the images captured by the camera 210, and those images can then be transferred and transmitted to provide the required evidence in the same manner as in the previous embodiment. Thus, once again, images are continuously captured and over time, are simply overwritten as the temporary storage becomes full. When a violation occurs, the images associated with the violation are identified and are extracted for providing evidence of the violation, the vehicle concerned and also of the driver of the vehicle if required in the same manner as described with reference to FIG. 3. Thus, apart from the modifications referred to above, FIG. 19 operates in exactly the same manner as FIG. 3 previously described, and the same reference numerals in FIG. 19 relate to the same components as described with reference to FIG. 3.

The method and system for processing violations described with reference to FIGS. 7 to 9 is also used with the embodiment of FIGS. 10 to 19. Thus, once the relevant images are identified, those images and the violation process occurs as described with reference to FIGS. 7 to 9. Thus, again in this embodiment of the invention, of all of the images which are continuously captured by the cameras, a set of images which are associated with a violation are identified and used as evidence. Those images may typically comprise two images showing the vehicle prior to violation occurring, one image clearly showing the violation and two images after the violation to provide a sequence of images showing the occurrence of the violation. Alternatively, only a sequence of images showing the actual violation, such as a sequence of images of a vehicle in the intersection during a red light phase can be provided. By providing a series of photographs, such as six photographs, once again a complete picture of the violation is provided and more images are available to enable proper identification of the vehicle and also of the driver of the vehicle.

Once again, although the preferred embodiment has been described with reference to a single processor 56 which performs all of the processing functions previously described, the processor can be made up of a number of separate processors, each for performing various processing functions.

In the claims which follow and in the preceding description of the invention, except where the context requires otherwise due to express language or necessary implication, the word "comprise", or variations such as "comprises" or "comprising", is used in an inclusive sense, ie. to specify the presence of the stated features but not to preclude the presence or addition of further features in various embodiments of the invention.

Since modifications within the spirit and scope of the invention may readily be effected by persons skilled within the art, it is to be understood that this invention is not limited to the particular embodiment described by way of example hereinabove.

The claims defining the invention are as follows:

1. A traffic violation detecting system, comprising:

a fixed camera configured to monitor a plurality of lanes of a road and to provide images of vehicles travelling in said plurality of lanes;

a violation detecting system configured to detect a traffic violation in any one of said plurality of lanes; and a reflecting system configured to direct illumination from said plurality of lanes to said fixed camera so that when a violation occurs in any one of said plurality of lanes, the reflecting system directs illumination from that one of said plurality of lanes to the fixed camera so the fixed camera can capture images of the violation occurring in that one of said plurality of lanes, wherein the reflecting system comprises a plurality of fixed mirrors, each configured to reflect illumination from one of the plurality of lanes to a portion of an image capture component of the camera.

2. The system of claim 1 wherein the camera has a fixed lens mounted between the camera and the reflecting system.

3. The system of claim 1 wherein the system includes a storage configured to store images captured by the camera and to identify images which relate to a violation detected by the violation detecting system so that the images associated with the violation are identifiable and can be processed to provide evidence of the violation and also identify a vehicle associated with the violation.

4. A traffic violation detecting system, comprising:

a fixed camera configured to monitor a plurality of lanes of a road and to provide images of vehicles travelling in said plurality of lanes;

a violation detecting system configured to detect a traffic violation in any one of said plurality of lanes; and a reflecting system configured to selectively direct illumination from any one of said plurality of lanes to said fixed camera so that when a violation occurs in any one of said plurality of lanes, the reflecting system configured to direct illumination from that one of said plurality of lanes to the fixed camera so the fixed camera can capture images of the violation occurring in that one of said plurality of lanes, wherein the violation detecting system comprises an inductive sensor configured to sense when a red light phase of a traffic signal is present and a vehicle detector configured to detect when a vehicle is present in a specified portion of the road.

5. The system of claim 4 wherein the reflecting system comprises a mirror and an adjusting mechanism configured to move the mirror so the mirror reflects illumination from the any one of said plurality of lanes to the fixed camera.

6. The system of claim 4 wherein the violation detecting system provides information relating to a lane in which a traffic violation is occurring, and the system further comprises a processor configured to receive the information and configured to output control signals to control a mirror to thereby adjust the position of the mirror so as to reflect illumination from the lane in which the violation is occurring so the camera captures images of the violation in that lane.

7. The system of claim 4 wherein the inductive sensor is mounted in proximity to an electric wire configured to supply electricity to activate the red light phase of the traffic signal.

8. The system of claim 4 wherein the vehicle detector comprises at least one laser per lane configured to detect the presence of the vehicle.

9. The system of claim 4 wherein the vehicle detector comprises at least two lasers per lane so that the lasers can determine the presence of the vehicle and the speed at which the vehicle is travelling.

10. The system of claim 4 wherein the vehicle detector comprises a camera mounted perpendicular to vehicle flow along the road.

11. The system of claim 4 wherein the camera has a source of illumination configured to illuminate any one of said plurality of lanes so that the illumination is reflected back from any one of said plurality of lanes by the reflecting system.

12. The system of claim 11 wherein the source of illumination comprises an infrared laser mounted on the camera and directed at the reflecting system, the infrared laser configured to provide infrared illumination to illuminate one of said plurality of lanes.

13. The system of claim 4 wherein the system further comprises a driver camera configured to capture images of a driver of the vehicle, and a storage configured to store the images and to identify images captured by the driver camera and which relate to the violation detected by the violation detecting system so that images of the driver of the vehicle associated with a violation are identifiable and can provide evidence of the identity of the driver of the vehicle associated with the violation.

14. The system of claim 4 wherein the system further comprises: a temporary storage configured to continuously store images taken by the fixed camera; and a processor configured to identify those images in the temporary storage which are associated with the violation so that those images associated with the violation can provide evidence of the violation.

15. The system of claim 14 wherein the system further comprises a secondary storage configured to receive the images associated with the violation from the temporary storage, and configured to store the images which are associated with the violation.

16. The system of claim 15 wherein the system further comprises a communication link configured to communicate images stored in the secondary storage to a central facility to provide evidence of the violation.

17. A dome camera assembly for a traffic violation system, the dome camera assembly comprising:

a housing having a dome;

a fixed camera mounted in the housing configured to monitor a plurality of lanes of a road through the dome; and a reflecting system in the housing configured to selectively reflect illumination from any one of said plurality of lanes to said fixed camera, wherein the housing has a cool chamber in which the camera is mounted and a warm chamber defined by at least part of the dome, the reflecting system being located in the warm chamber, and a heat transferring medium configured to transfer heat generated by the camera from the cool chamber into the warm chamber.

18. The assembly of claim 17 wherein the heat transferring medium is a Peltier heat transfer layer which separates the cool chamber from the warm chamber.

19. The assembly of claim 18 wherein the camera has a lens which is arranged in the warm chamber and in optical communication with the camera through an opening in the Peltier layer.

20. The assembly of claim 17 wherein the reflecting system comprises a mirror and an adjusting mechanism configured to move the mirror so that the mirror reflects illumination from one of said plurality of lanes to the camera, in response to detection of a traffic violation in any one of said plurality of lanes so the camera can capture images of the violation occurring in that lane.

21. A dome camera assembly for a traffic violation system, the dome camera assembly comprising:

a housing having a dome;

a fixed camera mounted in the housing configured to monitor a plurality of lanes of a road through the dome; and a reflecting system in the housing configured to reflect illumination from said plurality of lanes to said fixed camera, wherein the reflecting system comprises a plurality of fixed mirrors, each configured to reflect light from one of the plurality of lanes to a portion of an image capture component of the camera.

22. A traffic violation detecting system, comprising:

a fixed camera configured to monitor a plurality of lanes of a road and to provide images of vehicles travelling in said plurality of lanes;

a violation detecting system configured to detect a traffic violation in any one of said plurality of lanes; and a reflecting system configured to selectively direct illumination from said any one of said plurality of lanes to said fixed camera so that when a violation occurs in any one of said plurality of lanes, the reflecting system configured to direct illumination from that one of said plurality of lanes to the fixed camera so the fixed camera can capture images of the violation occurring in that one of said plurality of lanes, wherein the system includes a storage configured to store images captured by the fixed camera and to identify images which relate to a violation detected by the violation detecting system so that the images associated with the violation are identifiable and can be processed to provide evidence of the violation and also identify a vehicle associated with the violation, wherein the system further comprises a wide angle camera, and the storage stores images captured by the wide angle camera so that the images which relate to the violation detected by the violation detecting system are identifiable and can be processed to provide a wide angle view of the violation.

* * * * *